United States Patent
Egawa et al.

(10) Patent No.: US 7,866,827 B2
(45) Date of Patent: Jan. 11, 2011

(54) OPTICAL DEVICE AND OPTICAL APPARATUS

(75) Inventors: Akira Egawa, Shiojiri (JP); Satoshi Kinoshita, Matsumoto (JP); Kunihiko Takagi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1105 days.

(21) Appl. No.: 11/591,604

(22) Filed: Nov. 2, 2006

(65) Prior Publication Data

US 2007/0103647 A1 May 10, 2007

(30) Foreign Application Priority Data

Nov. 4, 2005 (JP) ............................. 2005-321071
Jun. 20, 2006 (JP) ............................. 2006-169865

(51) Int. Cl.
G03B 21/18 (2006.01)
G03B 21/26 (2006.01)

(52) U.S. Cl. ........................................ 353/54; 362/294

(58) Field of Classification Search .................. 353/54, 353/52, 119; 348/749; 349/161; 362/264, 362/294

See application file for complete search history.

(56) References Cited

U.S. PATENT DOCUMENTS

| 7,578,595 B2 * | 8/2009 | Miwa et al. ................... 353/54 |
| 2005/0117077 A1 * | 6/2005 | Utsunomiya .................... 349/5 |
| 2005/0157269 A1 | 7/2005 | Seto et al. |
| 2005/0219471 A1 * | 10/2005 | Kitabayashi ................. 353/54 |

FOREIGN PATENT DOCUMENTS

JP 2005-010630 1/2005

* cited by examiner

*Primary Examiner*—Georgia Y Epps
*Assistant Examiner*—Ryan Howard
(74) *Attorney, Agent, or Firm*—Oliff & Berridge, PLC

(57) ABSTRACT

An optical device according to an aspect of the invention includes: a plurality of optical elements; a base which supports the plurality of optical elements; and a plurality of element holders which holds the plurality of optical elements and each includes a holder side flow passage for cooling liquid to flow therein, the plurality of element holders holding the plurality of optical elements to connect the plurality of optical elements and the cooling liquid flowing in the holder side flow passage in a heat transferable manner. The base includes a plurality of plate members which are layered on each other to form at least one base side flow passage for the cooling liquid to flow therein. The plurality of element holders and the base can be connected to each other, so that the holder side flow passage and the at least one base side flow passage communicate with each other.

23 Claims, 16 Drawing Sheets

OPTICAL DEVICE AND OPTICAL APPARATUS

The entire disclosure of Japanese Patent Application No. 2006-169865, filed Jun. 20, 2006, is expressly incorporated by reference herein.

BACKGROUND

1. Technical Field

The present invention relates to an optical device and an optical apparatus.

2. Related Art

For an optical apparatus such as a projector, there has been known an arrangement in which an optical element such as a light source is cooled by circulating liquid (see, for example, Document: JP-A-2005-10630).

A projector described in the document includes, as a cooling structure for cooling the optical element such as the light source, a water-cooling jacket provided on an inner surface of an outer wall of the projector being opposite to the light source, a metal piping for heat releasing which is disposed on the outer wall, a pump that drives cooling liquid flowing in the water-cooling jacket, a flexible tube connecting the water-cooling jacket, the metal piping and the pump with each other such that the cooling liquid can flow therethrough. In such an arrangement, the cooling liquid receives heat generated by the light source and the heat is exhausted to the outside via the metal piping.

However, the projector described in the document requires work to dispose the metal piping along the outer wall and such piping work is troublesome.

In assembling, the flexible tube needs to be drawn to the water-cooling jacket, the pump and the metal piping. The drawing of the flexible tube is especially troublesome, when the projector includes not only one but a plurality of components to be cooled.

Hence, there are demands for an optical device and an optical apparatus which have a simple structure and can be easily assembled even when a plurality of optical elements (components to be cooled) is provided.

SUMMARY

An object of the invention is to provide an optical device and an optical apparatus which are simply structured and easily assembled.

An optical device according to an aspect of the invention includes: a plurality of optical elements; a base which supports the plurality of optical elements; and a plurality of element holders which can hold the plurality of optical elements and each includes a holder side flow passage for cooling liquid to flow therein, the plurality of element holders holding the plurality of optical elements to connect the plurality of optical elements and the cooling liquid flowing in the holder side flow passage in a heat transferable manner. The base includes a plurality of plate members which are layered on each other to form at least one base side flow passage for the cooling liquid to flow therein. The plurality of element holders and the base can be connected to each other, so that the holder side flow passage and the at least one base side flow passage communicate with each other.

According to the aspect of the invention, the plurality of element holders are connected to the base, so that the plurality of optical elements can be supported by the base. The holder side flow passage in the plurality of element holders are in communication with the base side flow passage in the base. The cooling liquid can flow through the holder side flow passage and the base side flow passage. The cooling liquid is flown in the holder side flow passage and the base side flow passage, so that heat generated in the plurality of optical elements is transferred to the cooling liquid, thereby effectively and collectively cooling the plurality of optical elements. Accordingly, even when the plurality of optical elements is to be cooled, it is not necessary to draw the flexible tube or the like between the optical elements so as to flow the cooling liquid. Hence, the optical device can be simply structured, and the assembling of the optical device can be easy.

In an optical device according to another aspect of the invention, the plurality of element holders may each preferably include a holder side connector to be in communication with the holder side flow passage and connected to the base. The base may preferably include a plurality of base side connectors to be in communication with the at least one base side flow passage and connected to the plurality of element holders. The holder side connector and the plurality of base side connectors may preferably be connected to each other, so that the holder side flow passage communicates with the at least one base side flow passage and the plurality of optical elements held by the plurality of element holders are positioned at predetermined positions relative to the base.

According to the aspect of the invention, the base side connector of the base is connected to the holder side connector of the element holders, so that the holder side flow passage is in communication with the base side flow passage and the plurality of optical elements held by the plurality of element holders can be positioned at predetermined positions. Hence, it is not necessary to adjust the plurality of optical elements held by the plurality of element holders to the predetermined positions relative to the base after connecting the base and the plurality of element holders, thereby further facilitating the assembling of the optical device.

In an optical device according to another aspect of the invention, at least one of the plurality of element holders preferably may preferably include a holder side connector to be in communication with the holder side flow passage and connected to the base. The base may preferably include a plurality of base side connectors to be in communication with the base side flow passage and connected to the at least one of the plurality of element holders. The holder side connector and the plurality of base side connectors may preferably be connected to each other, so that the holder side flow passage communicates with the base side flow passage and relative positions of the plurality of element holders and the base are adjusted.

For example, when the base side connector and the holder side connector are connected on a basis of the contour and the optical elements are positioned at the predetermined positions relative to the base, the optical elements need to be appropriately positioned relative to the element holders, which may complicate the attaching work of the optical elements to the element holders. Especially, when the optical elements are light source devices such as an LED module, the optical elements have different illumination distributions of the light beams irradiated from the light source devices. Hence, it is difficult to appropriately position the light source devices to the element holders such that the light beam is appropriately irradiated to the irradiation target on the downstream of the optical path.

According to the aspect of the invention, the holder side connector and the base side connector are adapted such that the positions of the element holders and the base can be relatively adjusted. Accordingly, it is not necessary to appropriately position the optical elements relative to the element holders. The optical elements can be appropriately positioned by adjusting the spatial positions of the elements holders relative to the base. Hence, the attaching work of the optical elements to the element holders can be less complicated. In addition, even when the optical elements are the light source devices, the light source device can be easily positioned such that the light beam is appropriately irradiated to the irradiation target by adjusting the spatial position of the element holder relative to the base as described above.

In an optical device according to another aspect of the invention, the holder side connector may preferably be a tubular member in which the cooling liquid can flow. The base side connectors may each preferably be a through hole in which a tip end of the tubular member can be loosely disposed.

According to the aspect of the invention, the tip end of the holder side connector (the tubular member) can be loosely disposed in the base side connector (the though hole). Accordingly, the spatial position of the tubular member can be adjusted owing to the gap between the tubular member and the through hole inside the through hole while the tip end of the tubular member is inserted in the through hole. In other words, the spatial position of the element holder relative to the base can be adjusted. Only by employing the tubular member as the holder side connector and the through hole as the base side connector, the spatial position of the element holder relative to the base can be adjusted, thereby simplifying the structure.

In an optical device according to another aspect of the invention, the holder side connector may preferably include: a tubular member in which the cooling liquid can flow; and a flange which is integrally formed on the tubular member to extend from an outer peripheral portion of the tubular member toward the outside. The base side connectors may each preferably be a through hole in which a tip end of the tubular member can be loosely disposed. The flange may preferably be connected to a position in the vicinity of the through hole.

According to the aspect of the invention, the tip end of the tubular member forming the holder side connector can be loosely disposed in the base side connector (the through hole). The tubular member is integrally provided with the flange. Accordingly, the spatial positions of the tubular member and the flange can be adjusted owing to the gap between the tubular member and the through hole inside the through hole while the tip end of the tubular member is inserted in the through hole. In other words, the spatial position of the element holder relative to the base can be adjusted.

Herein, since the flange is connectable in the vicinity of the through hole, by connecting the flange to the vicinity of the through hole after adjusting the spatial position of the element holder relative to the base as described above, the fixing state of the element holder to the base can be appropriately maintained as compared with the arrangement including no flanges, thereby preventing a positional displacement of the optical element from the base.

An optical device according to another aspect of the invention may preferably further include a flange. The holder side connector may preferably be a tubular member in which the cooling liquid can flow. The base side connectors may each preferably be a through hole in which a tip end of the tubular member can be loosely disposed. The flange in which the tubular member may preferably be inserted extends from an outer peripheral portion of the tubular member toward the outside, and the flange being connectable to a position in the vicinity of the through hole.

According to the aspect of the invention, the holder side connector (the tubular member) can be inserted in the flange, and the tip end of the tubular member can be loosely disposed in the base side connector (the through hole). Accordingly, while the tubular member is inserted in the flange in contact with the vicinity of the through hole and the tip end of the tubular member is inserted in the through hole, the flange and the tubular member can be moved in a first direction (the direction orthogonal to the direction in which the tubular member is inserted in the through hole) owing to the gaps between the tubular member and the through hole inside the through hole. Further, by moving the tubular member forward and backward relative to the flange, the tubular member can be moved in a second direction (the direction in which the tubular member is inserted in the through hole). In other words, the spatial position of the element holder can be adjusted relative to the base.

Herein, since the flange is connectable in the vicinity of the through hole, by connecting the flange to the vicinity of the through hole after adjusting the spatial position of the element holder relative to the base as described above, the fixing state of the element holder to the base can be appropriately maintained as compared with the arrangement including no flanges, thereby preventing a positional displacement of the optical element from the base.

Since the flange is provided to the tubular member as a separate component, the flange is not moved in accordance with the movement of the tubular member when position-adjusting the element holder in the second direction relative to the base as compared to the arrangement in which the flange is integrally formed to the tubular member. In other words, the flange can be maintained in contact with the vicinity of the through hole. Hence, the abutting state between the flange and the vicinity of the through hole can prevent the cooling liquid flowing in the base side flow passage from leaking via the through hole.

In an optical device according to another aspect of the invention, the tubular member may preferably be screwed and connected to the flange and to an element holder main body including one of the holder side flow passage. The tubular member and the element holder main body may preferably have one of a right-hand thread screw structure and a left-hand thread screw structure. The tubular member and the flange may preferably have the other one of the right-hand thread screw structure and the left-hand thread screw structure.

The right-hand thread screw structure herein is a screw structure in which when the tubular member is rotated clockwise (in the right-handed direction) while seeing an object (the element holder or the flange) into which the tubular member is screwed from the tubular member side, the tubular member is moved toward the object side. The left-hand thread screw structure is a screw structure in which when the tubular member is rotated counterclockwise (in the left-handed direction) while seeing the object (the element holder or the flange) into which the tubular member is screwed from the tubular member side, the tubular member is moved toward the object side.

According to the aspect of the invention, the tubular member is connected with the element holder main body in one of the right-hand thread screw structure and the left-hand thread screw structure, while the tubular member is connected with the flange in the other one of the right-hand thread screw structure and the left-hand thread screw structure. Accordingly, by rotating the tubular member in the predetermined direction, it is possible to move the element holder main body and the flange toward each other (the second direction). On the other hand, by rotating the tubular member in the reverse direction of the predetermined direction, it is possible to move the element holder main body and the flange away from each other (the second direction). Hence, when the flange is connected to the base, only by rotating the tubular member, the element holder main body can be position-adjusted relative to the base in the second direction. Thus, the position adjustment can be easily conducted in a stable state.

In an optical device according to another aspect of the invention, at least one of the plurality of element holders may preferably include an inflow port for letting the cooling liquid to flow thereinto and an outflow port for letting the cooling liquid therein to flow to the outside in one end surface, the one end surface abutting on the base, so that the holder side flow passage communicates with the at least one base side flow passage.

Note that when the element holder main body is provided with the tubular member and the base side flow passage of the base is in communication with the holder side flow passage of the element holder via the tubular member, the flow passage in which the cooling liquid flows becomes narrow due to the tubular member, thereby causing pressure loss due to the tubular member. Hence, it is difficult to flow the cooling liquid at an appropriate speed in the flow passage, which works against the effectiveness in cooling the optical element held by the element holder.

According to the aspect of the invention, the element holder includes the inflow port and the outflow port at the one end surface. The one end surface abuts to the base, thereby establishing a communication between the holder side flow passage and the base side flow passage. Hence, it is not necessary to provide the tubular member to the element holder, and the pressure loss of the cooling liquid in the flow passage can be prevented. Therefore, it is possible to flow the cooling liquid at an appropriate speed in the flow passage, thereby effectively cooling the optical element held by the element holder.

An optical device according to another aspect of the invention may further include: a fluid sending unit which sucks and sends the cooling liquid. The fluid sending unit may preferably be connected to the base to be supported by the base, so that the cooling liquid in the at least one base side flow passage can be sucked and sent to the at least one base side flow passage.

According to the aspect of the invention, the optical device is provided with the fluid sending unit. By connecting the fluid sending unit to the base, the fluid sending unit can suck the cooling liquid in the base side flow passage and sends the cooling liquid to the base side flow passage. Thus, the cooling liquid is forcibly circulated in the flow passage of the base side flow passage and the holder side flow passage. Hence, heat does not stay in the cooling liquid in the vicinities of the element holders in the flow passage, so that the plurality of optical elements can be effectively cooled.

Since the fluid sending unit is supported by the base, there is no need to employ another member for supporting the fluid sending unit, thereby downsizing the optical apparatus incorporating the optical device and reducing the cost thereof.

In an optical device according to another aspect of the invention, the base may preferably include a recess which is dented in a thickness direction of the base and is in communication with the at least one base side flow passage. The fluid sending unit may preferably be accommodated in the recess to be supported by the base, so that the cooling liquid in the at least one base side flow passage can be sucked and sent to the at least base side flow passage.

According to the aspect of the invention, the fluid sending unit is accommodated in the recess in the base, so that the space above the base can be effectively used as compared with, for example, the arrangement in which the fluid sending unit is mounted on the base.

An optical device according to another aspect of the invention may further include a heat releasing portion in which the cooling liquid can flow releases heat in the cooling liquid flowing therein to the outside. The heat releasing portion may preferably be connected to the base to be supported by the base, the heat releasing unit guiding the cooling liquid in the at least one base side flow passage thereinto and guiding the cooling liquid therein to the at least one base side flow passage.

According to the aspect of the invention, the optical device is provided with the heat releasing portion. By connecting the heat releasing portion to the base, the heat releasing portion can introduce the cooling liquid in the base side flow passage thereinto to release the heat of the cooling liquid. The heat releasing portion then returns the cooled cooling liquid to the base side flow passage. Hence, the temperature of the cooling liquid flowing in the flow passage can be lowered, and the plurality of optical elements can be effectively cooled by enhancing heat exchange capability between the plurality of optical elements and the cooling liquid.

Since the heat releasing portion is supported by the base, there is no need to employ another member for supporting the heat releasing portion, thereby downsizing the optical apparatus incorporating the optical device and reducing the cost thereof.

In an optical device according to another aspect of the invention, at least one of the plurality of plate members of the base may preferably be a heat conductive member.

According to the aspect of the invention, at least one of the plurality of plate members is a heat conductive member, heat of the cooling liquid flowing in the base side flow passage can be transferred to the plate members, so that the heat can be released to the outside. For example, by increasing the surface area of the plate member, the plate member can work as the heat releasing member. Accordingly, the cooling liquid flowing in the base side flow passage can be cooled, thereby effectively cooling the plurality of optical elements.

An optical apparatus according to an aspect of the invention includes the above-described optical device and an exterior casing which accommodates the optical device.

According to the aspect of the invention, since the optical apparatus is provided with the above-described optical device, the optical apparatus can also provide the same effects and advantages as those of the optical device.

In addition, the optical apparatus is provided with the optical device which can effectively and collectively cool the plurality of optical elements, thereby preventing heat degradation of the plurality of optical elements and enhancing the longevity thereof.

In an optical apparatus according to another aspect of the invention, the exterior casing may preferably be a heat conductive member. At least one of the plurality of plate members of the base may preferably be a heat conductive member to be connected to the exterior casing in a heat transferable manner when the optical apparatus is assembled.

According to the aspect of the invention, the exterior casing and at least one of the plurality of plate members of the base are heat conductive members, which are connected to each other in a heat transferable manner when the optical apparatus is assembled. Accordingly, heat in the cooling liquid flowing in the base side flow passage is transferred via a heat transferring passage through the plate members and the exterior casing. Hence, the exterior casing can work as the heat releasing member when the exterior casing has a relatively large surface area, so that the cooling liquid flowing in the base side flow passage can be cooled, thereby effectively cooling the plurality of optical elements.

An optical apparatus according to another aspect of the invention, at least one of the plurality of plate members of the base may preferably be a heat conductive member and be a portion of the exterior casing.

According to the aspect of the invention, since at least one of the plurality of plate members of the base is a portion of the exterior casing, the plate members and the portion of the exterior casing can be a common component, thereby reducing the number of components and decreasing the size and weight of the optical apparatus.

Since the plate members are heat conductive members, the heat in the cooling liquid flowing in the base side flow passage can be transferred to the plate members and then released to the outside of the optical apparatus. Hence, the plate members can work as the heat releasing member, so that the cooling liquid flowing in the base side flow passage can be cooled, thereby effectively cooling the plurality of optical elements.

An optical apparatus according to another aspect of the invention, the optical apparatus may preferably be a projector which modulates a light beam irradiated from a light source device to project the modulated light beam in an enlarged manner. The plurality of optical elements may preferably include the light source device. The light source device may preferably be a solid light-emitting device.

According to the aspect of the invention, the optical apparatus is a projector and the plurality of optical elements include a solid light emitting element, thereby reducing the size and the weight of the projector as compared, for example, with a projector employing an electric discharge type light source lamp. In addition to the advantages of employing the solid light emitting element, since the optical device has a simple cooling structure for the plurality of optical elements, the plurality of optical elements can be collectively and effectively cooled, thereby ensuring the downsized and weight-reduced projector with high reliability.

An optical apparatus according to another aspect of the invention may preferably further include a fluid sending unit which sucks and sends the cooling liquid. The base may preferably include a recess which is dented in a thickness direction of the base and is in communication with the at least one base side flow passage. The fluid sending unit may preferably be accommodated in the recess to be supported by the base in a planarly interfering manner with a component of the optical apparatus, so that the cooling liquid in the at least one base side flow passage can be sucked and sent to the at least one base side flow passage.

According to the aspect of the invention, the fluid sending unit is accommodated in the recess in the base, so that the space above the base can be effectively used as compared with, for example, the arrangement in which the fluid sending unit is mounted on the base. Hence, it is possible to dispose a component of the optical apparatus so as to planarly interfere with the fluid sending portion, thereby enhancing flexibility in design of the optical apparatus as well as downsizing the optical apparatus.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the attached drawings.

Arrangement of Projector

Figure 1:
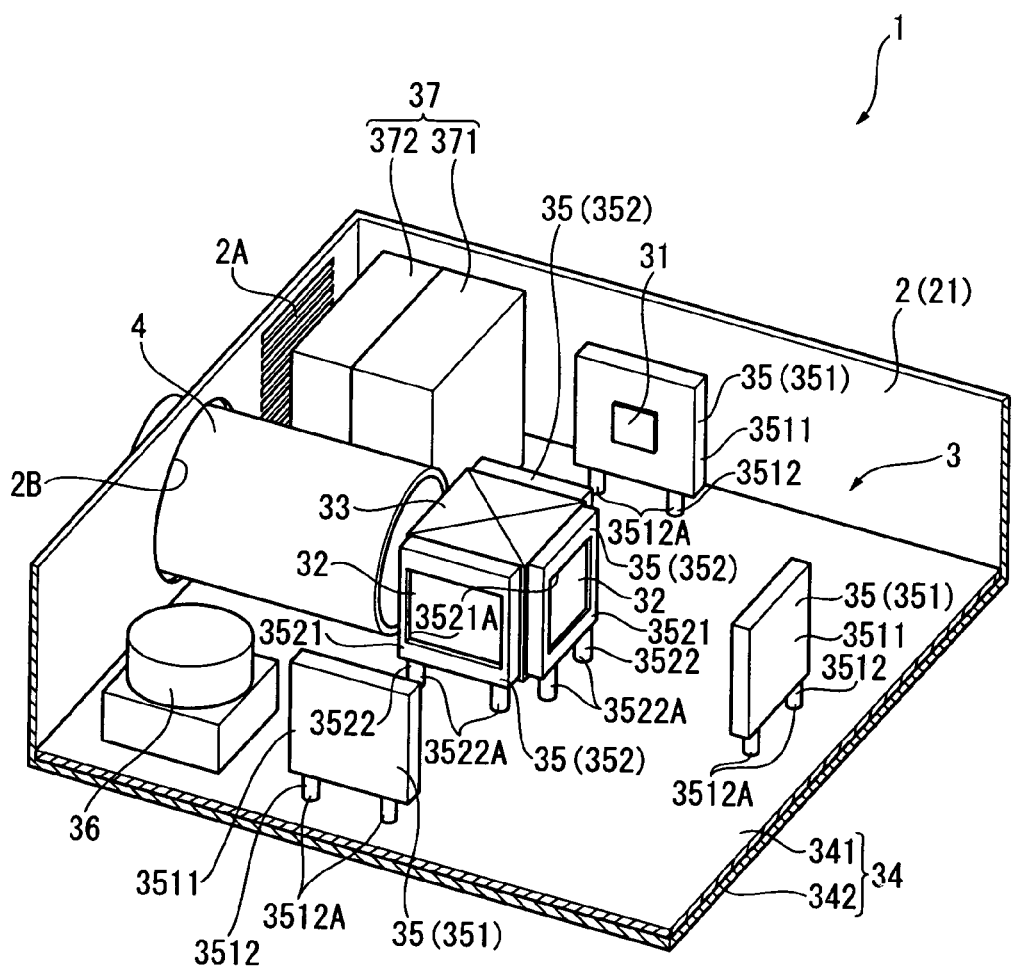
FIG. 1 schematically shows an arrangement of a projector (an optical apparatus) according to a first exemplary embodiment of the invention.
Figure 2:
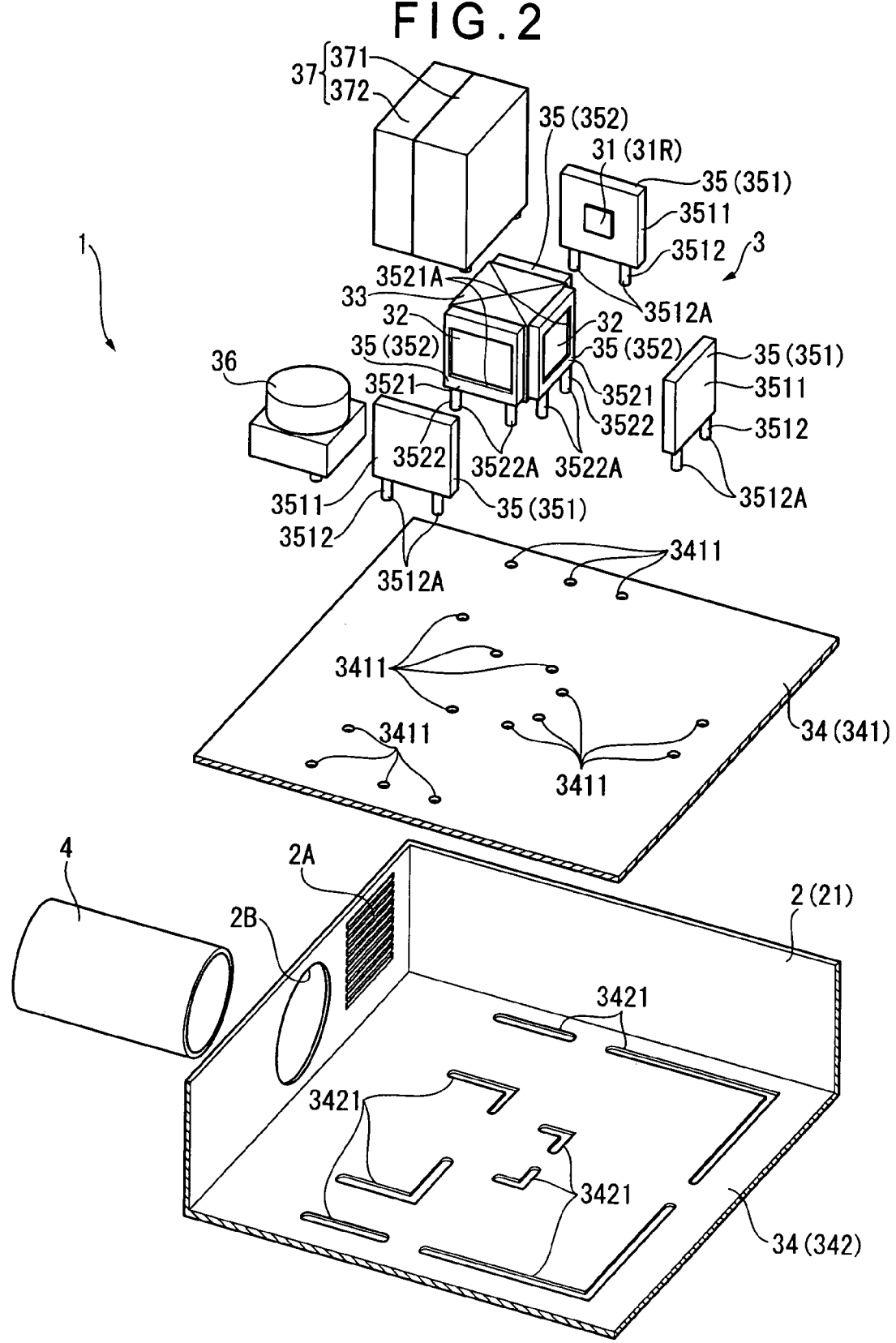
FIG. 2 schematically shows the arrangement of the projector according to the first exemplary embodiment.

FIGS. 1 and 2 schematically show an arrangement of a projector 1 (an optical apparatus) according to an aspect of the invention. In FIGS. 1 and 2, an upper surface and a portion of lateral surfaces of an exterior casing 2 are not shown for easy description.

The projector 1 modulates a light beam irradiated from a light source in accordance with image information to form an optical image and projects the formed optical image on a screen (not shown) in an enlarged manner. As shown in FIGS. 1 and 2, the projector 1 mainly includes the exterior casing 2, an optical device 3, a projection lens 4 (a projection optical device).

Although not shown in FIG. 1 or 2, disposed in the space not occupied by the optical device 3 and the projection lens 4 in the exterior casing 2 are a power supply unit for supplying electricity to components of the projector 1, a control unit for controlling the whole projector 1 and the like.

The exterior casing 2 is a casing for accommodating the optical device 3, the projection lens 4 and the like. Although not shown in FIG. 1 or 2, the exterior casing 2 is formed of a lower case 21 and an upper case affixed to the lower case 21 with screws or the like, the lower case 21 forming a front surface, a rear surface, lateral surfaces and a bottom surface of the projector 1, the upper case forming an upper surface of the projector 1.

As shown in FIGS. 1 and 2, provided in the front surface of the exterior casing 2 is an exhaust port 2A for exhausting hot air warmed in the projector 1.

In the vicinity of the exhaust port 2A, a hole 2B is provided such that an end of the projection lens 4 can be exposed therethrough to the outside.

Note that a bottom surface portion of the exterior casing 2 will be described in detail below.

Although details are described later, the optical device 3 optically processes the light beam irradiated from the light source to form the optical image (an color image) in accordance with the image information.

The projection lens 4 is a lens set of combined lenses. The projection lens 4 projects the color image formed by the optical device 3 on the screen (not shown) in an enlarged manner.

Arrangement of Optical Apparatus

As shown in FIGS. 1 and 2, the optical device 3 includes light source devices 31, liquid crystal light valves 32 (optical modulators), a cross dichroic prism 33 (a color-combining optical device), a base 34, element holders 35, a pump 36 (a fluid sending unit) and a heat releasing unit 37.

The light source device 31 lights and irradiates a light beam to the liquid crystal light valve 32 under the control of the control unit. Although not shown in FIG. 1 or 2, the light source devices 31 include a red color LED (Light Emitting Diode) module 31R irradiating red light, a green color LED module 31G irradiating green light and a blue color LED module 31B irradiating blue light (see FIG. 3), each LED module being disposed to be opposite to each of three lateral surfaces of the cross dichroic prism 33 via each element holder 35.

The LED modules have substantially the same arrangement. Although not shown in the figures, each LED module includes a plurality of LED elements (solid light emitting elements) aligned on a silicon substrate. Note that the LED elements of the LED module have different types of crystal and additives in order to irradiate red light, green light or blue light.

The light source device 31 is not limited to the above-described LED module but may be any solid luminous element such as a laser diode, an organic EL (Electro Luminescence) or a silicon luminous element.

Although not shown in FIG. 1 or 2, three liquid crystal light valves 32 are provided in line with the number of the LED modules. The liquid crystal light valves 32 are respectively fixed to the three lateral surfaces of the cross dichroic prism 33 via the respective element holders 35. The liquid crystal light valve 32 is a transmissive liquid crystal panel. The liquid crystal light valve 32 changes alignments of liquid crystal molecules sealed in liquid crystal cells (not shown) based on a drive signal from the control unit, the liquid crystal light valve 32 shielding or passing the color light irradiated form the LED modules to irradiate the optical image in accordance with the image information to the cross dichroic prism 33.

The cross dichroic prism 33 is an optical element that forms the color image by combining the optical images modulated for each color light beam from the liquid crystal light valves 32. The cross dichroic prism 33 has a substantially square shape in plan view with four right-angle prisms attached to each other. Two dielectric multi-layered films are formed on the boundaries adhering the right-angle prisms. The dielectric multi-layered films reflect the color light beams irradiated from the two confronting liquid crystal light valves 32 and pass the color light beam from the liquid crystal light valve 32 opposite to the projection lens 4. Thus, the color light beams modulated by the liquid crystal light valves 32 are combined into one color linage.

An other optical element may be disposed between the light source device 31 and the liquid crystal light valve 32, such as a polarization converter for aligning each polarization direction of the color light beams irradiated from the light source device 31 into linear polarized light in substantially one uniform direction; and an integrator illumination optical element such as a lens array in which rod integrators or a plurality of small lenses are disposed in a matrix form for uniformizing in-plane luminance of the color light irradiated from the light source device 31.

As shown in FIGS. 1 and 2, the base 34 supports the three light source devices 31 (the optical elements), the three liquid crystal light valves 32 and the cross dichroic prism 33 all via the element holders 35, the base 34 also supporting the pump 36 and the heat releasing unit 37. As shown in FIGS. 1 and 2, the base 34 includes a first plate member 341 and a second plate member 342 which are layered on each other.

As shown in FIGS. 1 and 2, the second plate member 342 is the bottom surface of the lower case 21. In other words, the second plate member 342 forming the base 34 is a portion of the exterior casing 2.

A surface of the second plate member 342 on the first plate member 341 side (that is, an inner surface of the bottom surface of the lower case 21) is provided with a plurality of grooves 3421 as shown in FIG. 2. In the first exemplary embodiment, eight grooves 3421 are formed as shown in FIG. 2. When the first plate member 341 and the second plate member 342 are layered on each other, the grooves 3421 define base side flow passages 34A for cooling liquid to flow (see FIG. 3).

As shown in FIGS. 1 and 2, the first plate member 341 has substantially the same contour as that of the inner surface of the bottom surface of the lower case 21 (that is, the second plate member 342). The first plate member 341 is attached to the inner surface. Note that the first plate member 341 and the second plate member 342 may be attached by any method such as welding and screwing via an elastic member. In other words, any attaching method may be employed as long as the cooling liquid in the base side flow passages 34A does not leak to the outside when the first plate member 341 and the second plate member 342 are attached to each other.

As shown in FIG. 2, the first plate member 341 is provided with a plurality of through holes 3411 penetrating the first plate member 341 such that the base side flow passages 34A are in communication with the outside when the first plate member 341 is attached to the second plate member 342. In the first exemplary embodiment, sixteen through holes 3411 are formed in line with the number of the grooves 3421 as shown in FIG. 2. The through hole 3411 works as a base side connector for connecting the element holders 35, the pump 36 and the heat releasing unit 37.

The through hole 3411 may have a shape in which an upper portion of the through hole 3411 has a larger diameter than that of a lower portion to form a step (not shown in the figures).

In the first exemplary embodiment, the exterior casing 2 and the base 34 are made of a metal material such as aluminum.

However, the material of the exterior casing 2 and the base 34 is not limited to metals but may be any as long as the material is heat conductive. In addition, only the lower case 21 of the exterior casing 2 may be a heat conductive member.

As shown in FIGS. 1 and 2, the element holders 35 include three light source holders 351 and three panel holders 352.

As shown in FIGS. 1 and 2, the three light source holders 351 have the same shape to respectively hold the three light source devices 31 in a heat transferable manner. As shown in FIGS. 1 and 2, the light source holder 351 includes a plate body 3511 and a fluid passing portion 3512.

As shown in FIGS. 1 and 2, the plate body 3511 is a plate member having a rectangular shape in plan view, the plate body 3511 supporting and fixing the fluid passing portion 3512 in the plate body 3511.

The fluid passing portion 3512 is a tubular member having a C-shape in plan view, in which the cooling liquid can flow. The fluid passing portion 3512 is supported and fixed in the plate body 3511 such that both end portions 3512A project from a lower side surface of the plate body 3511 as shown in FIGS. 1 and 2. In other words, the fluid passing portion 3512 is a holder side flow passage 351A (see FIG. 3) for the cooling liquid to flow through the light source holder 351.

The both end portions 3512A of the fluid passing portion 3512 are inserted in the through holes 3411 in the base 34 in order to work as a holder side connector for connection with the base 34.

A manufacturing method of the light source holder 351 has no particular limitation and may be any.

For example, the plate body 3511 includes a pair of plate bodies that are assembled so as to sandwich the fluid passing portion 3512.

As another example, the plate body 3511 and the fluid passing portion 3512 may be integrally formed by insert-molding.

Such light source holder 351 may be made of aluminum.

However, the material of the light source holder 351 is not limited to metals but may be any as long as the material is heat conductive.

As shown in FIGS. 1 and 2, the three panel holders 352 have the same shape to hold each of the three liquid crystal light valves 32 in a heat transferable manner. As shown in FIGS. 1 and 2, the panel holder 352 includes an outer frame 3521 and a fluid passing portion 3522.

As shown in FIGS. 1 and 2, the outer frame 3521 is a rectangular plate body having an opening 3521A of a rectangular shape in plan view for passing the light beam. The outer frame 3521 supports and fixes the fluid passing portion 3522 therein so as to enclose the opening 3521A.

The fluid passing portion 3522 is a tubular member having a C-shape in plan view in which the cooling liquid flows. The fluid passing portion 3522 is supported and fixed in the outer frame 3521 such that both end portions 3522A project from a lower side surface of the outer frame 3521 as shown in FIGS. 1 and 2. In other words, the fluid passing portion 3522 is a holder side flow passage 352A (see FIG. 3) for the cooling liquid to flow in the panel holder 352.

The both end portions 3522A of the fluid passing portion 3522 are inserted in the through holes 3411 of the base 34 in order to work as the holder side connector for connection with the base 34.

The three panel holders 352 fix the liquid crystal light valves 32 fitted in the openings 3521A. The panel holders 352 are respectively fixed to the three lateral surfaces of the cross dichroic prism 33 with the focus-adjusted liquid crystal light valves 32.

In other words, the three liquid crystal light valves 32 and the cross dichroic prism 33 are integrated via the three panel holders 352.

Note that a manufacturing method and a material of the panel holder 352 may be the same as the above-described light source holder 351.

By inserting the both end portions 3512A, 3522A of the element holders 35 in the through holes 3411 of the base 34 to connect the element holders 35 to the base 34, the base side flow passages 34A and the holder side flow passages 351A, 352A are brought into communication (see FIG. 3), where the cooling liquid can flow through the base side flow passages 34A and the holder side flow passages 351A, 352A.

In this state, the both end portions 3512A, 3522A abut on the step portions of the through holes 3411. Thereby, the light source devices 31 and the liquid crystal light valves 32 all held by the element holders 35 are positioned at predetermined positions relative to the base 34. Specifically, in such a state, the color light irradiated from the light source device 31 is illuminated on a whole image formation area of the liquid crystal light valve 32, and the light source device 31 and the liquid crystal light valve 32 are on a predetermined illumination optical axis. Hence, a length of the both end portions 3512A, 3522A in a projecting direction thereof and a shape of the through holes 3411 are set such that the light source devices 31 and the liquid crystal light valves 32 can be positioned at the predetermined positions.

The pump 36 sucks and sends the cooling liquid. Projected from a lower side surface of the pump 36 is a pair of flow portions 361 for sucking and sending the cooling liquid (see FIG. 3). The pump 36 is supported and fixed to the base 34 by inserting the pair of flow portions 361 in the through holes 3411 of the base 34. In this state, the pump 36 is disposed on the flow passage formed of the base side flow passages 34A and the holder side flow passages 351A, 352A (see FIG. 3), and the cooling liquid in the flow passage can be sucked and sent via the pair of flow portions 361 by the drive of the pump 36.

The heat releasing unit 37 is adapted such that the cooling liquid can flow therein. The heat releasing unit 37 releases heat from the cooling liquid. As shown in FIGS. 1 and 2, the heat releasing unit 37 includes a radiator 371 (a heat releasing portion) and a cooling fan 372.

The radiator 371 is adapted such that the cooling liquid can flow therein. The radiator 371 releases heat from the cooling liquid. Projected from a lower side surface of the radiator 371 is a pair of flow portions 3711 for the cooling liquid to flow therein (see FIG. 3). The radiator 371 is supported and fixed by the base 34 by inserting the pair of flow portions 3711 in the through holes 3411 of the base 34. In this state, the radiator 371 is disposed on the flow passage of the base side flow passages 34A and the holder side flow passages 351A, 352A (see FIG. 3). Although not shown in the figures, the radiator 371 is also provided with an air flow passage in the vicinity of the flow passage in which the cooling liquid flows, the air flow passage penetrating the radiator 371 for air to flow therethrough.

The cooling fan 372 is fixed to the radiator 371 and sucks the air inside the projector 1 via the air flow passage formed in the radiator 371 and exhausts the air to the outside of the projector 1 via the exhaust port 2A of the exterior casing 2.

Figure 3:
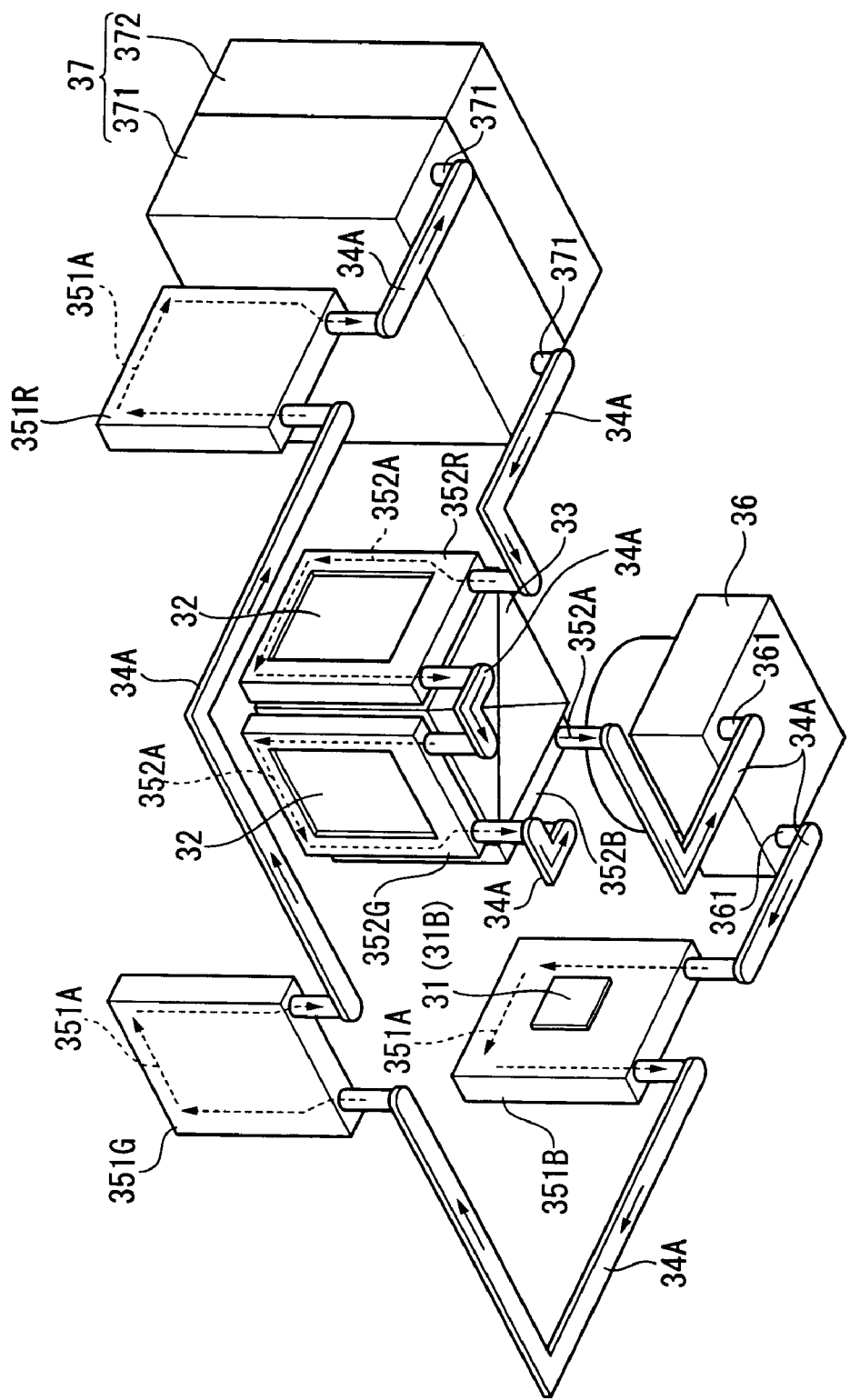
FIG. 3 schematically shows how cooling liquid circulates through a flow passage in an optical device according to the first exemplary embodiment.

FIG. 3 schematically shows how the cooling liquid flows. FIG. 3 is a view when seeing from a lower side of the projector 1 and shows how the cooling liquid circulates. Note that, in FIG. 3, the base 34 and the like are omitted for easy description. In the description below, the three light source holders 351 on the red, green and blue color light sides are respectively called a light source holder 351R, a light source holder 351G and a light source holder 351B for easy description. Similarly, the three panel holders 352 are respectively called a panel holder 352R, a panel holder 352G and a panel holder 352B.

In the first exemplary embodiment, as shown in FIG. 3, by connecting the element holders 35, the pump 36 and the radiator 371 to the base 34, the element holders 35, the pump 36 and the radiator 371 are tandemly connected via the base side flow passages 34A and the holder side flow passages 351A, 352A.

By driving the pump 36, the cooling liquid is sent to the base side flow passage 34A from the pump 36.

The cooling liquid flown into the base side flow passage 34 flows into the holder side flow passage 351 in the light source holder 351B. Herein, heat generated by the drive of the LED module 31B is transferred to the cooling liquid flowing in the holder side flow passage 351A via the light source holder 351B.

The cooling liquid then flows from the holder side flow passage 351A in the light source holder 351B to the base side flow passage 34A to flow into the holder side flow passage 351A in the light source holder 351G. Herein, heat generated by the drive of the green LED module (not shown) is transferred to the cooling liquid flowing in the holder side flow passage 351A via the light source holder 351G.

The cooling liquid then flows from the holder side flow passage 351A in the light source holder 351G to the base side flow passage 34A to flow into the holder side flow passage 351A in the light source holder 351G. Herein, heat generated by the drive of the LED module 31R is transferred to the cooling liquid flowing in the holder side flow passage 351A via the light source holder 351R.

The cooling liquid then flows from the holder side flow passage 351A in the light source holder 351R to the base side flow passage 34A to flow into the radiator 371. Herein, heat in the cooling liquid flowing in the radiator 371 is released via the radiator 371 to the outside, and the released hot air is exhausted via the exhaust port 2A to the outside of the projector 1 by the drive of the cooling fan 372.

The cooling liquid flowing in the radiator 371 flows into the base side flow passage 34A to flow into the holder side flow passage 352A in the panel holder 352R. Herein, heat in the red liquid crystal light valve 32 generated by an irradiation of the light beam from the LED module 31R is transferred to the cooling liquid flowing in the holder side flow passage 351A via the panel holder 352R.

The cooling liquid flowing in the holder side flow passage 352A in the panel holder 352R flows to the base side flow passage 34A to flow into the holder side flow passage 352A in the panel holder 352G. Herein, heat in the green liquid crystal light valve 32 generated by an irradiation of the light beam from the green LED module is transferred to the cooling liquid flowing in the holder side flow passage 352A via the panel holder 352G.

The cooling liquid flowing in the holder side flow passage 352A in the panel holder 352G flows to the base side flow passage 34A to flow into the holder side flow passage 352A in the panel holder 352B. Herein, heat in the blue liquid crystal light valve 32 generated by an irradiation of the light beam from the LED module 31B is transferred to the cooling liquid flowing in the holder side flow passage 352A via the panel holder 352B.

The cooling liquid flowing in the holder side flow passage 352A in the panel holder 352B flows to the base side flow passage 34A. Then, the cooling liquid is sucked into (returns into) the pump 36.

As described above, the cooling liquid circulates through the pump 36, the light source holder 351B, the light source holder 351G, the light source holder 351R, the radiator 371, the panel holder 352R, the panel holder 352G, the panel holder 352B and the pump 36 via the base side flow passages 34A and the holder side flow passages 351A, 352A.

The first exemplary embodiment described above includes following advantages.

In the first exemplary embodiment, the element holders 35 are connected to the base 34, so that the light source devices 31, and the liquid crystal light valves 32 and the cross dichroic prism 33 which are integrated can be supported by the base 34. The holder side flow passages 351A, 352A in the element holders 35 and the base side flow passages 34A in the base 34 are in communication, so that the cooling liquid can flow through the holder side flow passages 351A, 352A and the base side flow passage 34A. Since the cooling liquid flows in the holder side flow passages 351A, 352A and the base side flow passages 34A, the heat generated in the optical elements 31, 32 is transferred to the cooling liquid via the element holders 35, so that the optical elements 31, 32 can be collectively and effectively cooled. Accordingly, even when a plurality of optical elements are to be cooled, it is not necessary to draw the flexible tube or the like between the optical elements so as to flow the cooling liquid. Hence, the optical device 3 can be simply structured, and the assembling of the optical device 3 can be easy.

Thus, heat degradation of the optical elements 31, 32 can be reduced, thereby increasing the longevity of the projector 1 and facilitating the assembling of the projector 1.

The length of the both end portions 3512A, 3522A of the element holders 35 in the projecting direction and the shape of the through holes 3411 of the base 34 are set such that the light source devices 31 and the liquid crystal light valves 32 can be positioned at predetermined positions relative to the base 34. Hence, only by inserting the both end portions 3512A, 3522A in the through holes 3411, the holder side flow passages 351A, 352A can be in communication with the base side flow passages 34A, and the optical elements 31, 32 can be positioned at the predetermined positions relative to the base 34. Hence, it is not necessary to adjust the optical elements 31, 32 held by the element holders 35 to the predetermined positions relative to the base 34 after connecting the base 34 and the element holders 35, thereby further facilitating the assembling of the optical device 3.

In addition, by providing the pump 36 to the optical device 3 and connecting the pump 36 to the base 34, the pump 36 can suck the cooling liquid in the base side flow passages 34A to send the cooling liquid to the base side flow passages 34A, thereby forcibly circulating the cooling liquid through the flow passage formed of the base side flow passages 34A and the holder side flow passages 351A, 352A. Hence, heat does not stay in the cooling liquid in the vicinities of the element holders 35 in the flow passage, so that the optical elements 31, 32 can be effectively cooled.

Additionally, by proving the heat releasing unit 37 to the optical device 3 and connecting the radiator 371 to the base 34, the cooling liquid in the base side flow passages 34A can flow into the radiator 371, so that the cooling liquid can be cooled in the radiator 371 and returned to the base side flow passages 34A. Accordingly, the temperature of the cooling liquid flowing in the flow passage can be lowered, and the optical elements 31, 32 can be effectively cooled by enhancing heat exchange capability between the optical elements 31, 32 and the cooling liquid.

Since the pump 36 and the heat releasing unit 37 are also supported by the base 34, there is no need to employ another member for supporting the pump 36 and the heat releasing unit 37, thereby downsizing the projector 1 and reducing the cost thereof.

Since the second plate member 342 of the base 34 is a portion of the lower case 21, the second plate member 342 of the base 34 and the lower case 21 can be one common component, thereby reducing the number of components and decreasing the size and weight of the projector 1.

Since the exterior casing 2 is a heat conductive member, the heat in the cooling liquid flowing in the base side flow passages 34A can be transferred to the exterior casing 2 and then released to the outside of the projector 1. Accordingly, the exterior casing 2 can also work as a heat releasing member, so that the cooling liquid flowing in the base side flow passages 34A can be cooled not only by the heat releasing unit 37 but also by the exterior casing 2, thereby effectively cooling the optical elements 31, 32.

Further, since the projector 1 employs the LED module as the light source device 31, the projector 1 can be downsized and weight-reduced as compared with, for example, a projector employing an electric discharge type light source lamp. In addition to the advantages of employing the LED module, since the projector 1 employs the optical device 3 of a simple cooling structure for the optical elements 31, 32, the optical elements 31, 32 can be collectively and effectively cooled, thereby ensuring the downsized and weight-reduced projector 1 with high reliability.

Second Exemplary Embodiment

A second exemplary embodiment of the invention will be described below with reference to the attached drawings.

In the description below, the same reference numerals will be attached to the structures and components same as the first exemplary embodiment to omit or simplify the explanation.

Figure 4:
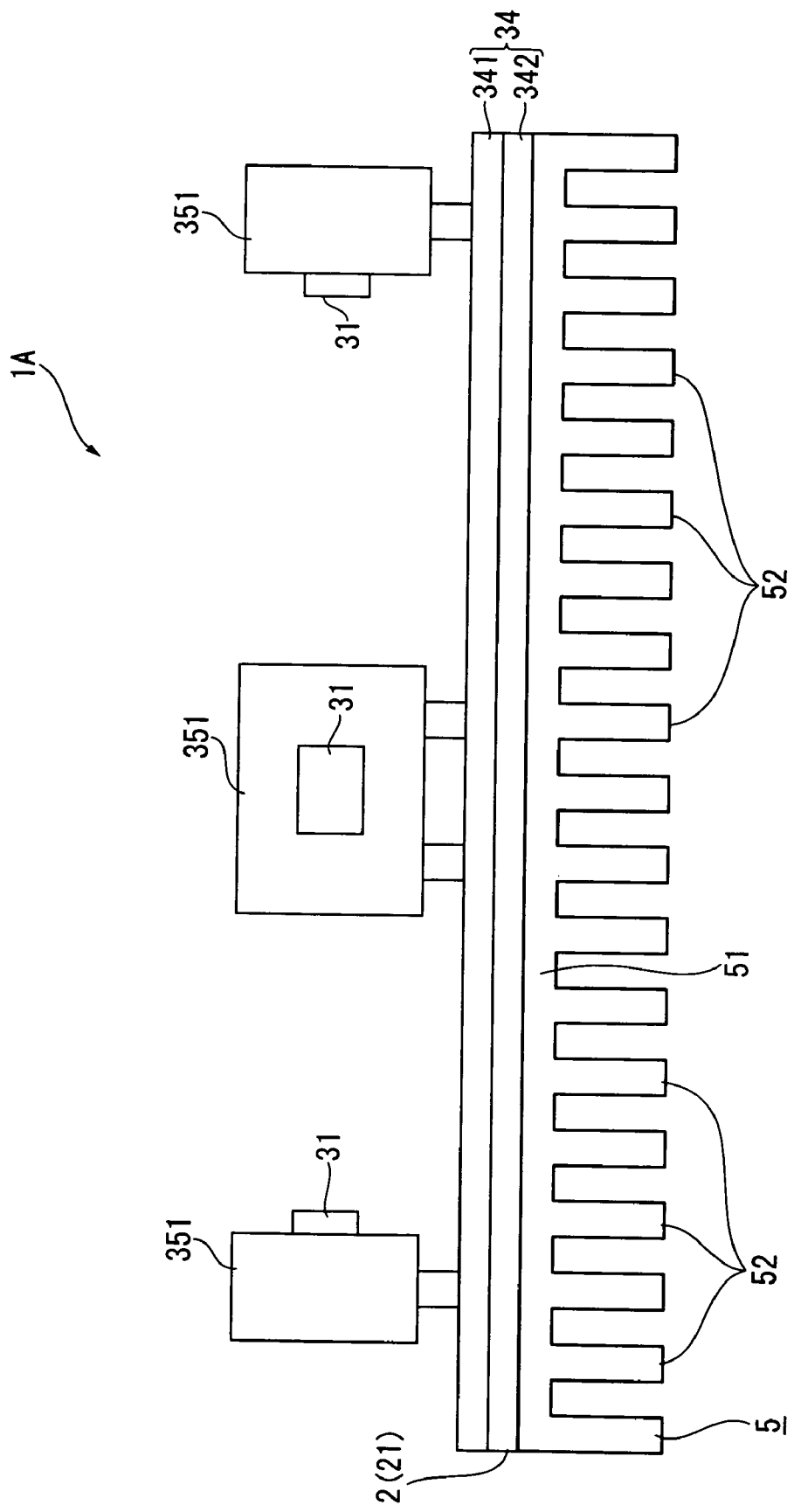
FIG. 4 schematically shows an arrangement of a projector according to a second exemplary embodiment of the invention.

FIG. 4 schematically shows an arrangement of the projector 1 according to the second exemplary embodiment of the invention. Note that FIG. 4 only shows the base 34, the light source devices 31 and the light source holders 351. The other components are not shown for easy description.

In the second exemplary embodiment, as shown in FIG. 4, the projector 1A is different from the first exemplary embodiment only in that a heat sink 5 is disposed outside the exterior cashing 2. The other arrangements other than the heat sink 5 are the same as the first exemplary embodiment.

Specifically, the heat sink 5 may be a heat conductive metal member. As shown in FIG. 4, the heat sink 5 is attached on a lower surface of the second plate member 342 of the base 34 (that is, on an outer surface of the bottom surface of the exterior cashing 2), the heat sink 5 being provided in a heat transferable manner with the second plate member 342. The heat sink 5, which is a heat conductive metal member, includes: a plate member 51 having substantially the same shape as the bottom surface of the exterior cashing 2; and a plurality of fins 52 projecting from the plate member 51 in a direction toward the outside of the plate member 51.

In addition to the advantages same as the first exemplary embodiment, the second exemplary embodiment further includes following advantages.

Since the heat sink 5 is provided, heat transferred to the exterior cashing 2 from the base side flow passages 34A can be effectively released by the heat sink 5. Hence, the cooling liquid in the base side flow passages 34A can be further cooled, thereby cooling the optical elements 31, 32 more effectively.

When the heat sink 5 is provided, heat releasing effectiveness of the cooling liquid can be enhanced, so that the heat releasing unit 37 may not be provided.

Third Exemplary Embodiment

A third exemplary embodiment of the invention will be described below with reference to the attached drawings.

In the description below, the same reference numerals will be attached to structures and components same as the first exemplary embodiment to omit or simplify explanation.

Figure 5:
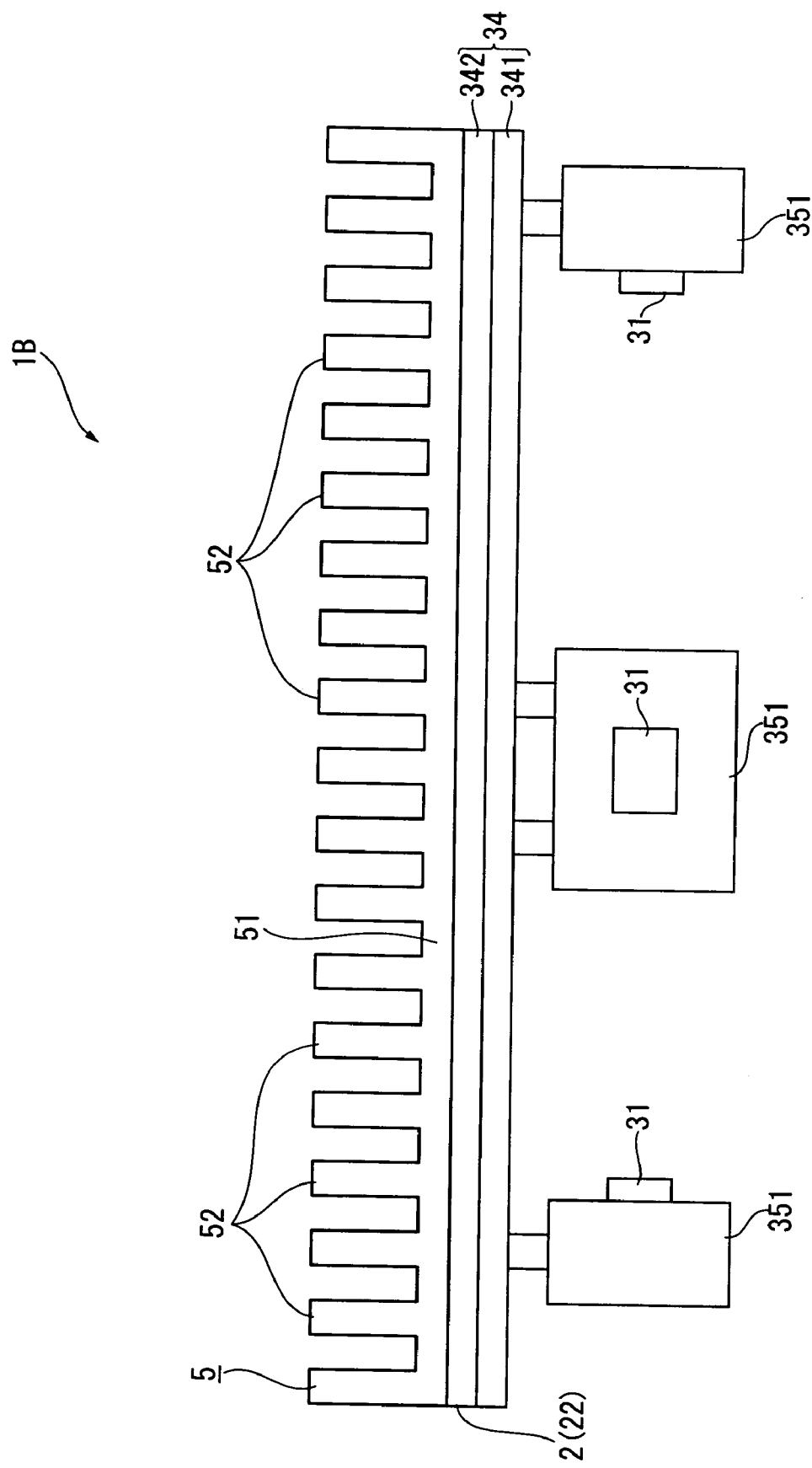
FIG. 5 schematically shows an arrangement of a projector according to a third exemplary embodiment of the invention.

FIG. 5 schematically shows an arrangement of the projector 1B according to the third exemplary embodiment. Like FIG. 4, FIG. 5 only shows the base 34, the light source devices 31 and the light source holders 351. The other components are not shown for easy description.

In the third exemplary embodiment, as shown in FIG. 5, the projector 11B is different from the first exemplary embodiment only in that the base 34 is disposed at a different position and the heat sink 5 is disposed outside the exterior cashing 2. The other arrangements other than the position of the base 34 and the provision of the heat sink 5 are the same as the first exemplary embodiment.

Specifically, as shown in FIG. 5, the base 34 is disposed on the upper side in the vertical direction of the light source holders 351 and the like. In other words, the second plate member 342 forming the base 34 is the upper surface of the upper case 22 of the exterior cashing 2.

As described in the second exemplary embodiment, the heat sink 5 includes the plate member 51 and the plurality of fins 52 which are both heat conductive. As shown in FIG. 5, the heat sink 5 is attached on the upper surface of the second plate member 342 of the base 34 (that is, on the outer surface of the upper surface of the exterior cashing 2) in a heat transferable manner with the second plate member 342.

Also in the third exemplary embodiment, in which the heat sink 5 is provided and the base 34 is disposed upside down, the same advantages as the first and second exemplary embodiments can be obtained.

Fourth Exemplary Embodiment

A fourth exemplary embodiment of the invention will be described below with reference to the attached drawings.

In the description below, the same reference numerals will be attached to structures and components same as the first exemplary embodiment to omit or simplify explanation.

Figure 6:
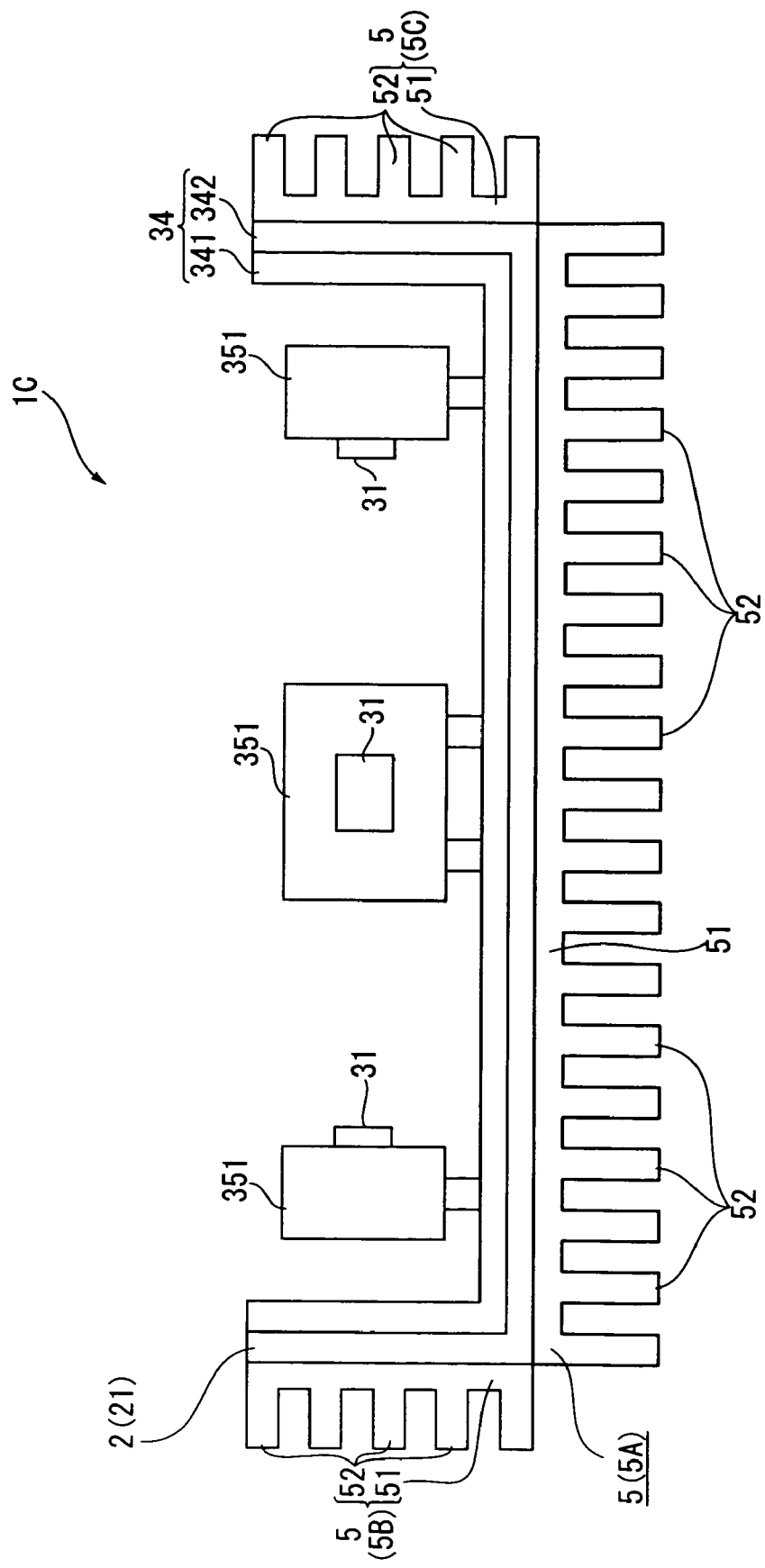
FIG. 6 schematically shows an arrangement of a projector according to a fourth exemplary embodiment of the invention.

FIG. 6 schematically shows an arrangement of the projector 1C according to the fourth exemplary embodiment. Like FIGS. 4 and 5, FIG. 6 only shows the base 34, the light source devices 31 and the light source holders 351. The other components are not shown for easy description.

In the fourth exemplary embodiment, as shown in FIG. 6, the projector 1C is different from the first exemplary embodiment only in that the base 34 has a different shape and the heat sink 5 is disposed outside the exterior cashing 2. The other arrangements other than the shape of the base 34 and the provision of the heat sink 5 are the same as the first exemplary embodiment.

Specifically, as shown in FIG. 6, the first plate member 341 of the base 34 is formed to have a U-shape in side view to fit with the lateral and bottom surfaces of the exterior casing 2.

The heat sink 5 includes a first heat sink 5A, a second heat sink 5B and a third heat sink 5C each having the plate member 51 and the plurality of fins 52 which are all heat conductive as described in the second and third exemplary embodiments. As shown in FIG. 6, the first heat sink 5A is provided on the lower surface of the second plate member 342 of the base 34 (that is, on the outer surface of the bottom surface of the exterior cashing 2) in a heat transferable manner with the second plate member 342. As shown in FIG. 6, the second heat sink 5B and the third heat sink 5C are provided on the lateral surfaces of the second plate member 342 of the base 34 (that is, on the outer surfaces of the lateral surfaces of the exterior cashing 2) in a heat transferable manner with the second plate member 342.

In addition to the advantages same as the first exemplary embodiment, the fourth exemplary embodiment further includes following advantages.

Since the first plate member 341 has the U-shape in side view, a surface area of the first plate member 341 to receive the heat from the cooling liquid in the base side flow passages 34A can be increased, thereby enhancing the heat releasing effectiveness of the cooling liquid.

Further, since the three heat sinks 5A, 5B and 5C are provided on the bottom and lateral surfaces of the exterior casing 2, the heat releasing effectiveness of the cooling liquid can be further enhanced, which is another advantage in addition to the advantages obtained by the above-described shape of the base 34.

Fifth Exemplary Embodiment

A fifth exemplary embodiment of the invention will be described below with reference to the attached drawings.

In the description below, the same reference numerals will be attached to structures and components same as the first exemplary embodiment to omit or simplify explanation.

Figure 7:
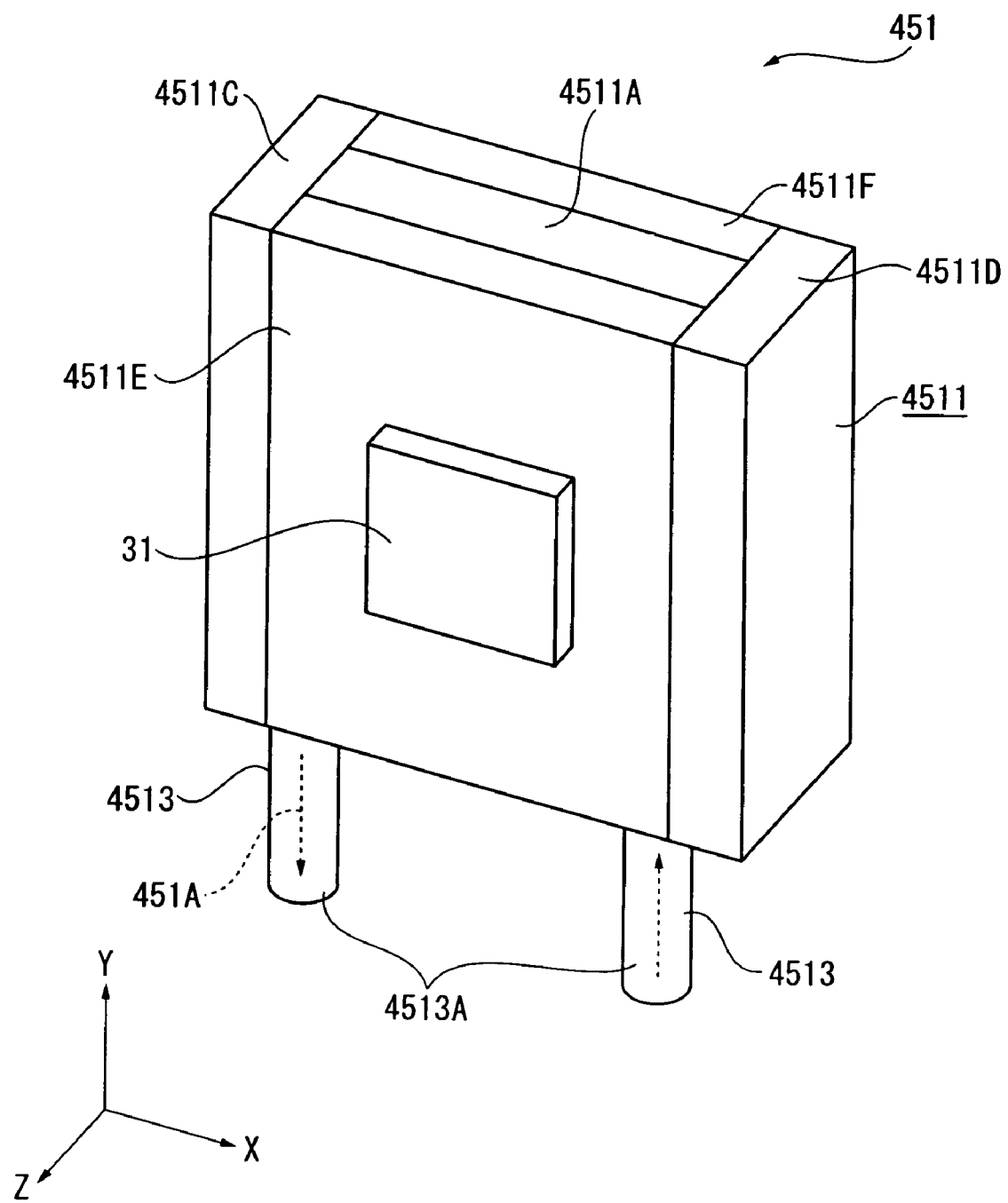
FIG. 7 schematically shows an arrangement of a light source holder according to a fifth exemplary embodiment of the invention.
Figure 8A:
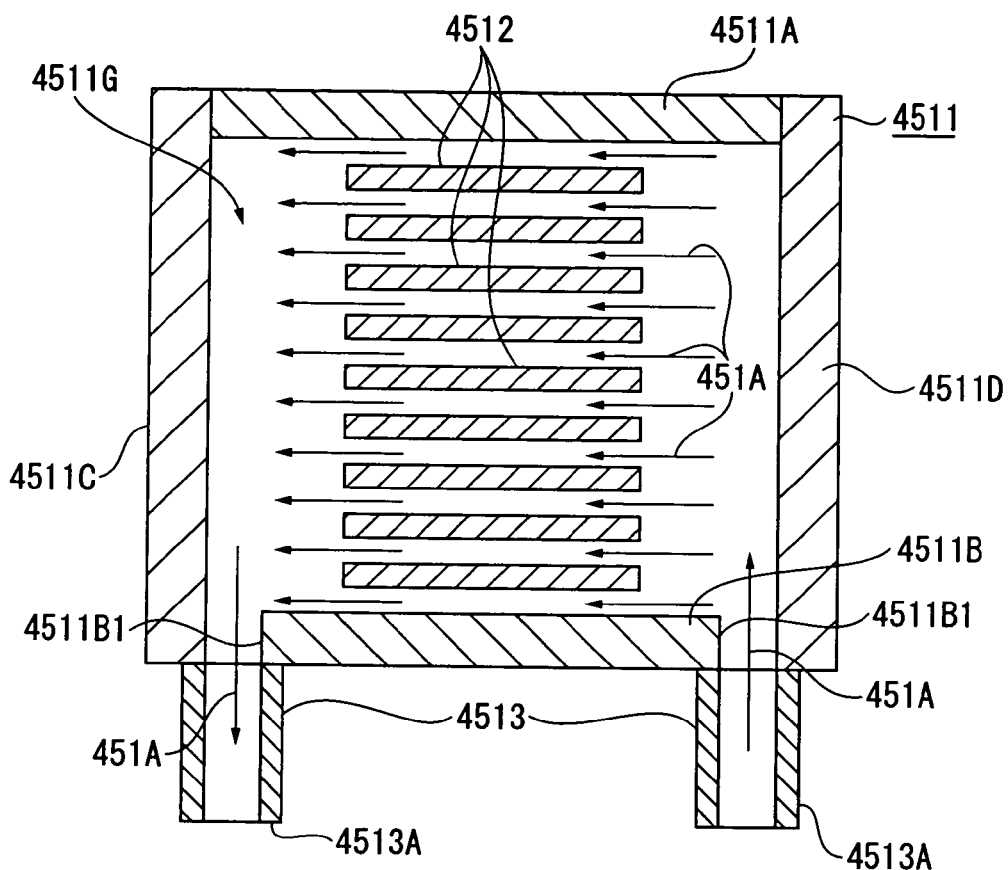
FIGS. 8A and 8B schematically show the arrangement of the light source holder according to the fifth exemplary embodiment.
Figure 8B:
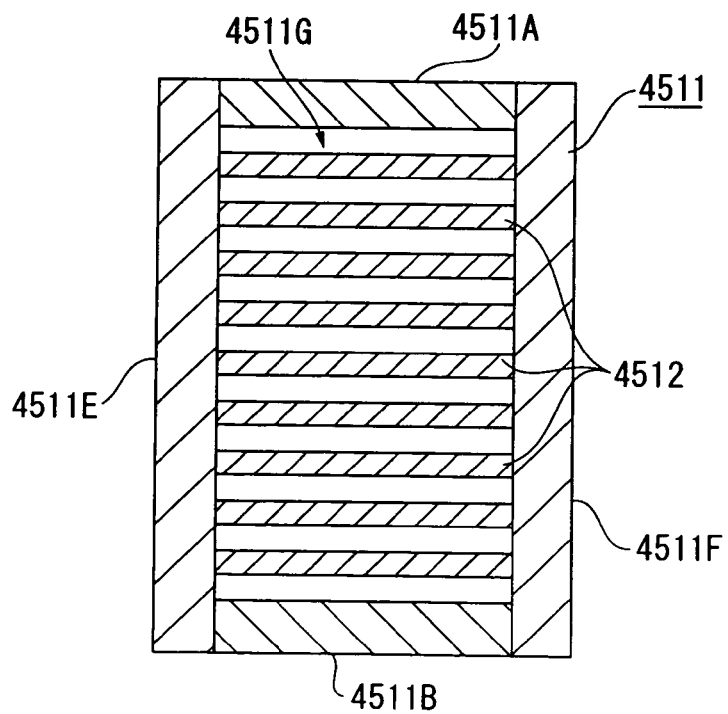

FIGS. 7, 8A and 8B schematically show an arrangement of the light source holder 451 of the fifth exemplary embodiment. In FIG. 7, the irradiation direction of the light beam from the light source device 31 held by the light source holder 451 is defined as Z-axis and the two directions orthogonal to Z-axis are defined as X-axis and Y-axis. Specifically, FIG. 7 is a perspective view of the light source holder 451 when seen from the upper side of the light source holder 451. FIG. 8A is a cross section of the light source holder 451 cut in a plane parallel to the X-Y plane. FIG. 8B is another cross section of the light source holder 451 cut in a plane parallel to the Y-Z plane.

The fifth exemplary embodiment is different from the first exemplary embodiment only in the structure of the light source holder 451. The other arrangements other than the structure of the light source holder 451 are the same as the first exemplary embodiment.

As shown in FIGS. 7, 8A and 8B, the light source holder 451 includes an outer frame 4511, a plurality of plates 4512 (FIGS. 8A and 8B) and a pair of fluid passing portions 4513.

As shown in FIGS. 7, 8A and 8B, the outer frame 4511 includes six plate bodies 4511A to 4511F which are heat conductive metal members to form a rectangular parallelepiped when combined together. As shown in FIGS. 8A and 8B, the outer frame 4511 contains space 4511G enclosed by the six plate bodies 4511A to 4511F.

The plate body 4511B forming a lower side surface of the outer frame 4511 out of the six plate bodies 4511A to 4511F is provided with a pair of communicating holes 4511B1 communicating the space 4511G and the outside of the outer frame 4511 as shown in FIG. 8A.

As shown in FIG. 7, the light source device 31 is held in a heat transferable manner by a surface of the plate body 4511E disposed along the X-Y plane out of the six plate bodies 4511A to 4511F.

The plurality of plates 4512 are heat conductive metal members which are disposed in the space 4511G inside the outer frame 4511 as shown in FIG. 8A, the plates 4512 being connected to the outer frame 4511 in a heat transferable manner. More specifically, the plates 4512 may have a thickness approximately of several tens to several hundreds of micrometers. As shown in FIGS. 8A and 8B, the plates 4512 are provided between the plate bodies 4511E and 4511F disposed along the X-Y plane of the outer frame 4511 such that the surfaces of the plates 4512 are parallel to the X-Z plane with a distance approximately of several tens to several hundreds of micrometers. The plates 4512 are connected to the pair of the plate bodies 4511E, 4511F in a heat transferable manner.

As shown in FIGS. 7 and 8A, the pair of fluid passing portions 4513 is tubular members for the cooing liquid to flow therein. Ends of the fluid passing portions 4513 on one side are respectively connected to the pair of communicating holes 4511B1 in the plate body 4511B of the outer frame 4511.

The ends 4513A on the other side of the fluid passing portions 4513 are inserted in the through holes 3411 of the base 34 to work as the holder side connector for connection with the base 34. In this state, the pair of fluid passing portions 4513 are in communication with the base side flow passages 34A. As shown in FIGS. 7 and 8, the cooling liquid flowing in the base side flow passages 34A is introduced into the space 4511G via one of the fluid passing portions 4513. In the space 4511G, the cooling liquid flows through spaces between the plates 4512 as shown in FIG. 8A. As shown in FIGS. 7 and 8A, the cooling liquid in the space 4511G is returned to the base side flow passages 34A via the other one of the fluid passing portions 4513. Thus, the pair of the fluid passing portions 4513 and the space 4511G form holder side flow passages 451A (FIGS. 7 and 8A) for the cooling liquid to flow inside the light source holder 451.

In other words, the light source holder 451 may be a so-called heat exchanger such as a microchannel.

In addition to the advantages same as the first exemplary embodiment, the fifth exemplary embodiment further includes following advantages.

Each of the three light source holders 451 includes the outer frame 4511, the plurality of plates 4512 and the fluid passing portions 4513. The light source holder 451 is a heat exchanger such as a microchannel. Hence, the surface area to contact the cooling liquid flowing in the light source holder 451 can be increased. Accordingly, heat generated by the light source devices 31 can be effectively transferred to the cooling liquid flowing in the holder side flow passages 451A, thereby enhancing the cooling effectiveness of the light source devices 31.

Sixth Exemplary Embodiment

A sixth exemplary embodiment of the invention will be described below with reference to the attached drawings.

In the description below, the same reference numerals will be attached to structures and components same as the first exemplary embodiment to omit or simplify explanation.

Figure 9:
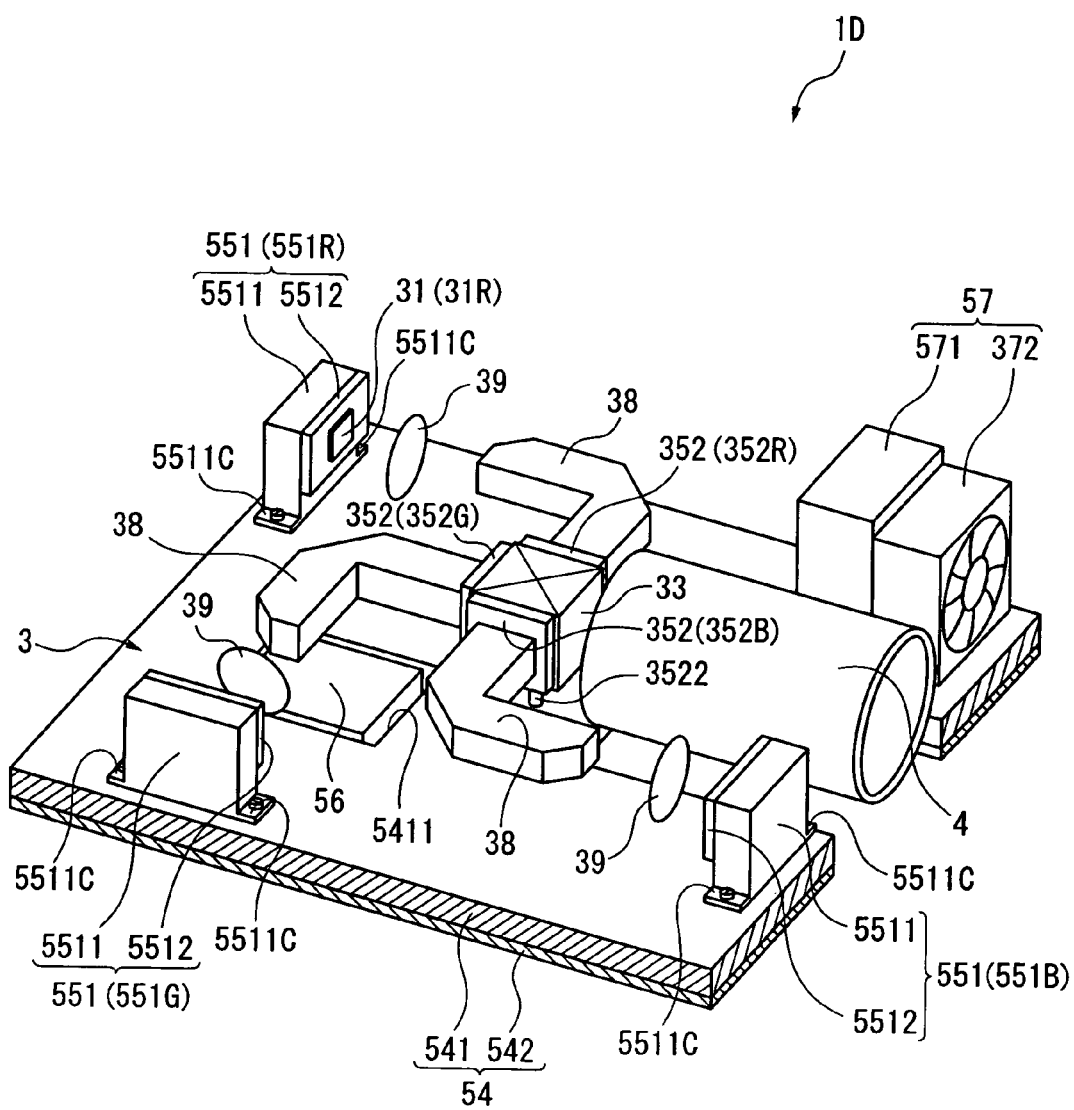
FIG. 9 schematically shows an arrangement of a projector (an optical apparatus) according to a sixth exemplary embodiment of the invention.
Figure 10:
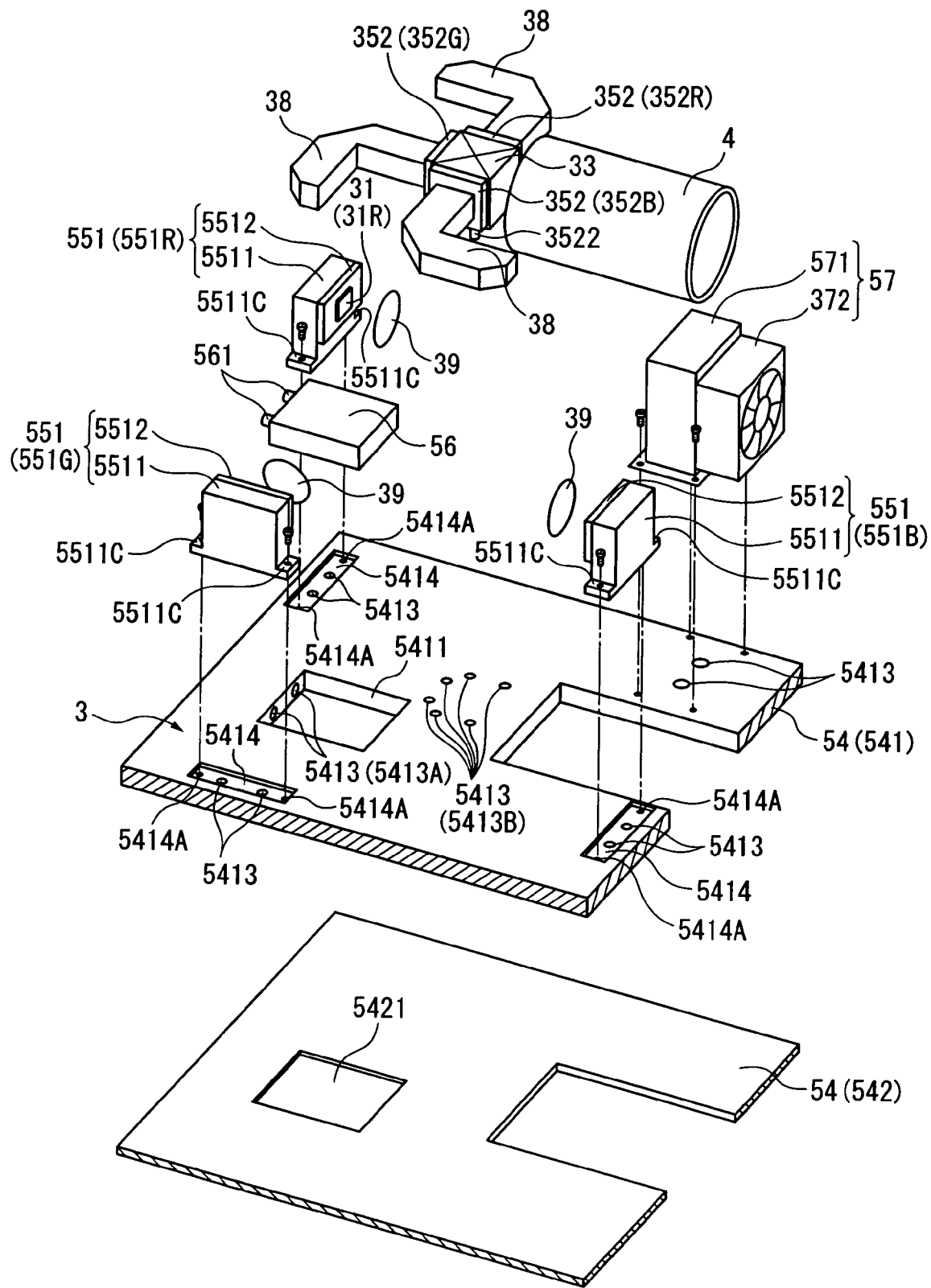
FIG. 10 schematically shows the arrangement of the projector according to the sixth exemplary embodiment.

FIGS. 9 and 10 schematically show an arrangement of a projector 1D (an optical apparatus) of the sixth exemplary embodiment. Note that, in FIGS. 9 and 10, the exterior casing is omitted for easy description.

The sixth exemplary embodiment is different from the first exemplary embodiment only in that three rod integrators 38 and three condenser lenses 39 are added; that a base 54, light source holders 551 (element holders), a pump 56 (the fluid sending unit) and a heat releasing unit 57 are modified; and that the components 31 to 33, 38, 39, 56, 57 are disposed at different positions. The other arrangements are the same as the first exemplary embodiment.

The three rod integrators 38 have substantially the same arrangement. As shown in FIGS. 9 and 10, the rod integrators 38 are disposed on the upstream of the optical path of the respective panel holders 352 (the liquid crystal light valves 32). The color light irradiated from the light source device 31 enters the rod integrator 38. The rod integrator 38 substantially uniforms illumination distribution of the incident light to irradiate the uniformed light toward the liquid crystal light valve 32. As shown in FIGS. 9 and 10, the rod integrator 38 extends from the light-irradiation side end opposite to the panel holder 352 (the liquid crystal light valve 32) toward the light-incident side end. The end portion in the extending direction is folded substantially by 90 degrees, forming a substantially L-shape in plan view.

The rod integrator 38 may be a rod integrator of which inside is generally made of light transmissive members, the rod integrator having a function to guide light introduced thereinto from the light-incident side end to the light irradiation side end while reflecting the light by total internal reflection by means of a difference in refractive index of a medium on boundaries of a side surface of the rod in order to substantially uniform the illumination distribution of the light irradiated from the light-irradiation side end. The rod integrator 38 may not be limited to the above-described type rod integrator, but may be another type (a so-called light tunnel) which is hollow with a reflecting surface covering an inner surface, the rod integrator herein guiding light introduced thereinto from the light-incident side end to the light-irradiation side end while reflecting the light by the reflecting surface of the inner surface in order to substantially uniform the illumination distribution of the light irradiated from the light-irradiation side end.

The three condenser lenses 39 have substantially the same arrangement. As shown in FIGS. 9 and 10, the condenser lenses 39 are disposed so as to be opposite to the light-incident side ends of the rod integrators 38 to condense the color light irradiated from the light source devices 31 in order to introduce the condensed light thereinto from the light-incident side ends of the rod integrators 38 on the downstream of the optical paths.

As shown in FIGS. 9 and 10, the base 54 supports the three light source devices 31, the three liquid crystal light valves 32 and the cross dichroic prism 33 all via the light source holders 551 and the panel holders 352, the base 54 supporting the pump 56 and the heat releasing unit 57. As shown in FIGS. 9 and 10, the base 54 includes a first plate member 541 and a second plate member 542 which are layered on each other.

As shown in FIGS. 9 and 10, the second plate member 542 has a C-shape in plan view and is disposed on the bottom surface of the exterior casing (not shown).

A surface of the second plate member 542 on the first plate member 541 side is provided with a second accommodation portion 5421 having a slightly larger shape than that of the pump 56 as shown in FIG. 10. The second accommodation portion 5421 is recessed in the thickness direction of the second plate member 542 to accommodate the pump 56.

Figure 11:
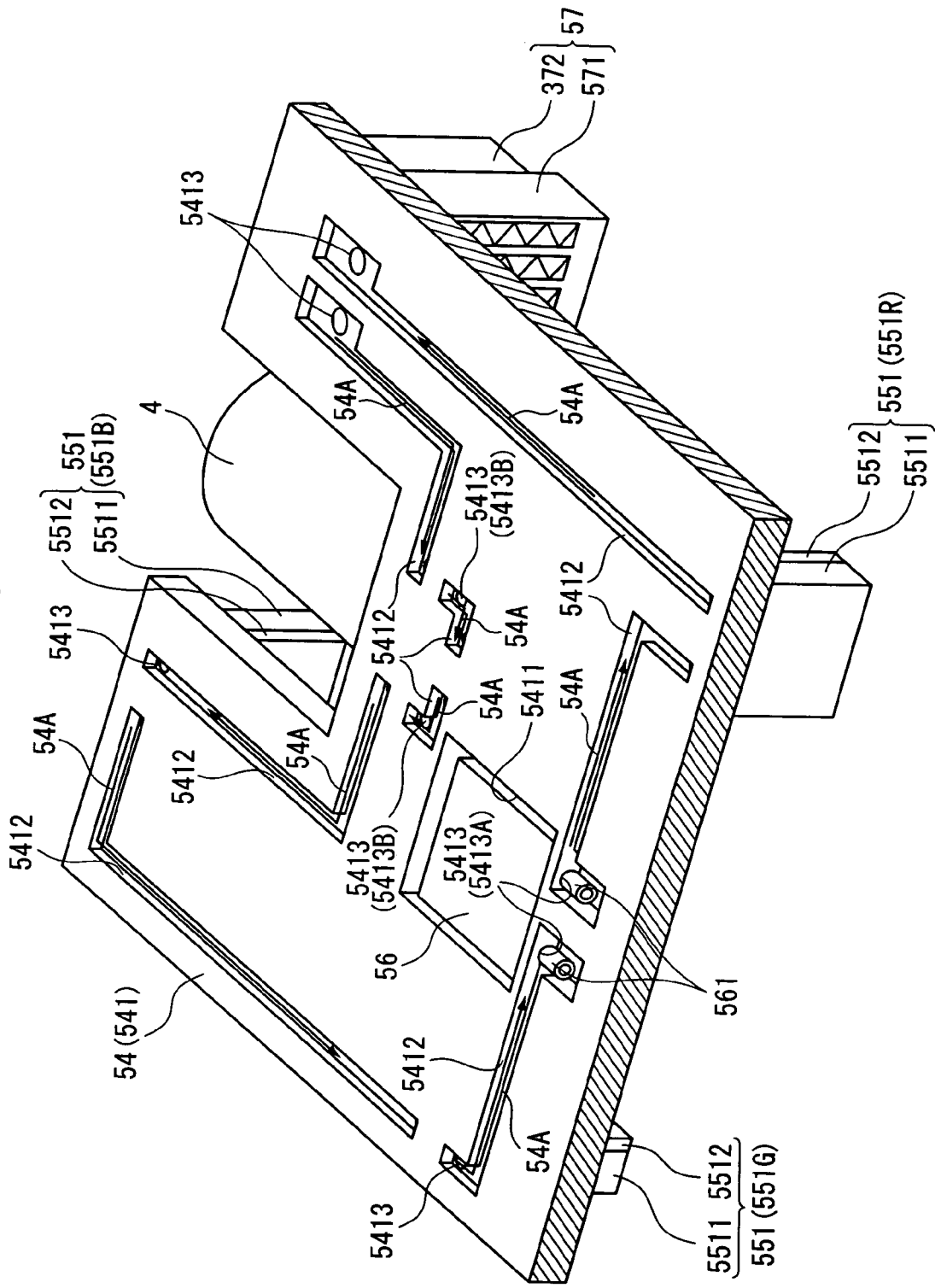
FIG. 11 is a perspective view when seeing a first plate member from its lower side according to the sixth exemplary embodiment.

FIG. 11 is a perspective view of the first plate member 541 when seen from the lower side (that is, the second plate member 542 side).

As shown in FIGS. 9 and 10, the first plate member 541 has a C-shape in plan view, which is substantially the same as the second plate member 542.

As shown in FIGS. 9 and 11, the first plate member 541 is provided with a first accommodation portion 5411 at a position corresponding to the position of the second accommodation portion 5421 of the second plate member 542. The shape of the first accommodation portion 5411 is slightly lager than that of the pump 56. The first accommodation portion 5411 penetrates the first plate member 541 to accommodate the pump 56.

Thus, the first accommodation portion 5411 and the second accommodation portion 5421 are recesses according to the aspect of the invention.

The first plate member 541 is also provided with a plurality of grooves 5412 in the surface on the second plate member 542 side as shown in FIG. 11. In the sixth exemplary embodiment, eight grooves 5412 are provided as shown in FIG. 8. When the first plate member 541 and the second plate member 542 are layered and attached to each other, the grooves 5412 define base side flow passages 54A for cooling liquid to flow as shown in FIG. 11. Note that the first plate member 541 and the second plate member 542 may be attached by any method such as welding and screwing via an elastic member as described in the first exemplary embodiment. In other words, any attaching method may be employed as long as the cooling liquid in the base side flow passages 54A does not leak to the outside when the first plate member 541 and the second plate member 542 are attached.

As shown in FIGS. 10 and 11, the first plate member 541 is provided with a plurality of through holes 5413 such that the base side flow passages 54A are in communication with the outside when the first plate member 541 is attached to the second plate member 542. In the sixth exemplary embodiment, sixteen through holes 5413 are formed in line with the number of the grooves 5412 as shown in FIGS. 10 and 11.

Two through holes 5413A out of the plurality of through holes 5413 are provided in a lateral wall of the first accommodation portion 5411 so as to be in communication with two of the grooves 5412.

As shown in FIGS. 10 and 11, the other through holes 5413 other than the through holes 5413A out of the plurality of through holes 5413 are provided at positions corresponding to ends of the groove 5412 so as to penetrate the first plate member 451.

Similarly to the shape of the through holes 3411 described in the first exemplary embodiment, through holes 5413B corresponding to the panel holders 352 out of the plurality of through holes 5413 may have a shape with an upper portion having a larger diameter than that of a lower portion, forming a step. The through holes 5413B work as the base side connectors for positioning the both end portions 3512A (the holder side connector) of the fluid passing portions 3512 of the panel holders 352 at predetermined positions.

As shown in FIG. 10, recesses 5414 corresponding to the shape of the lower ends of the light source holders 551 are formed in the vicinities of the through holes 5413C corresponding to the light source devices 551 out of the plurality of through holes 5413. The light source holders 551 are positioned at predetermined positions on the base 54 by engaging the lower ends with the recesses 5414. As shown in FIG. 10, formed in the bottom surface of the recess 5414 are screw holes 5414A for fixing the light source holders 551.

In the sixth exemplary embodiment, the base 54 is made of a metal material such as aluminum similarly to the first exemplary embodiment. Note that, although not shown in the figures, the exterior casing to which the base 54 is attached (for example, the lower case) is also made of the metal such as aluminum, the exterior casing being connected to the base 54 in a heat transferable manner.

However, the material of the base 54 and the exterior casing are not limited to metals but may be any as long as the material is heat conductive.

Figure 12:
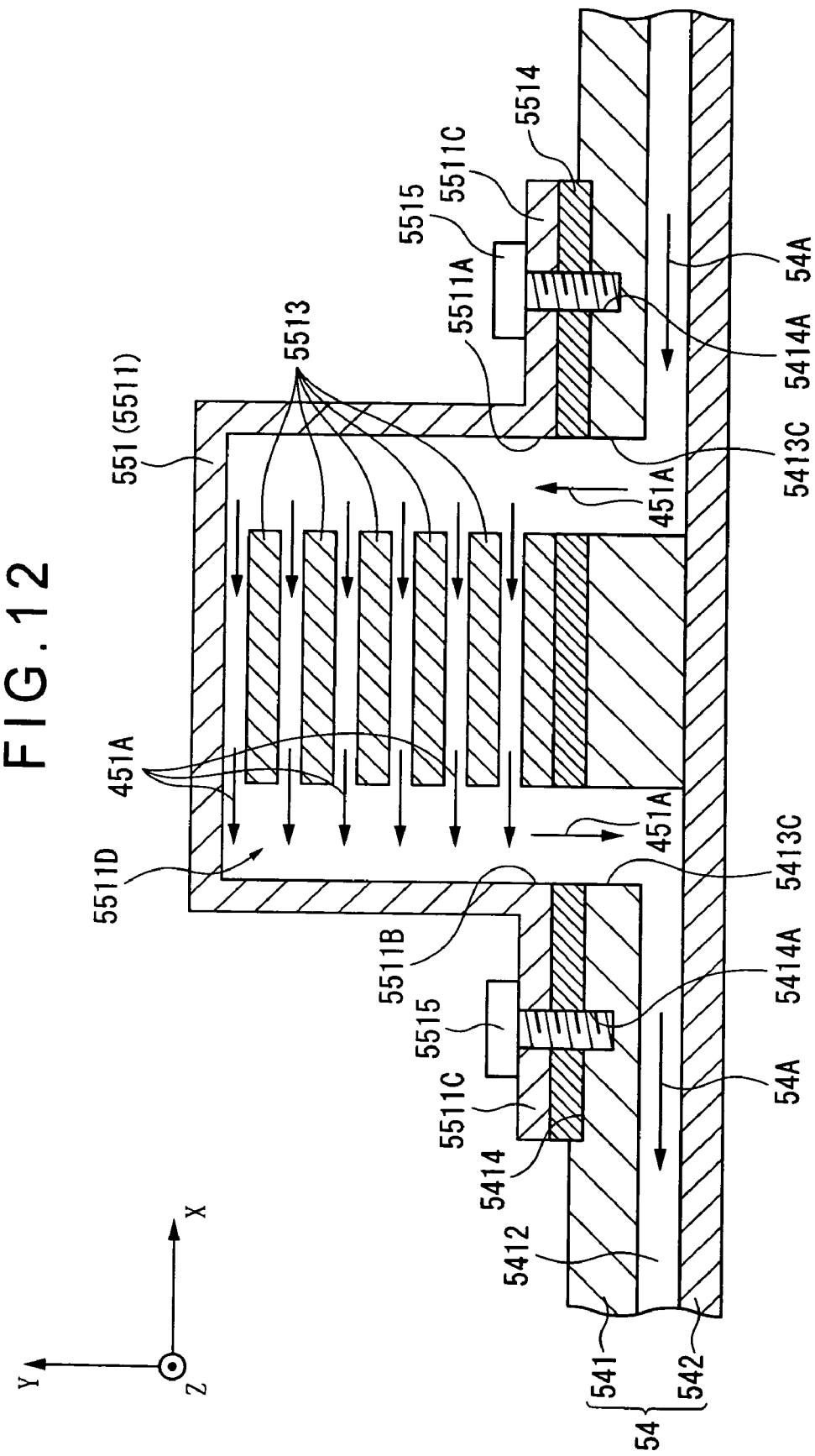
FIG. 12 schematically shows how a light source holder is connected to a base according to the sixth exemplary embodiment.

FIG. 12 is a cross section showing how the light source holder 551 is connected to the base 54. In FIG. 12, the irradiation direction of the light beam from the light source device 31 held by the light source holder 551 is defined as Z-axis and the two directions orthogonal to Z-axis are defined as X-axis and Y-axis for easy description. More specifically, FIG. 12 is a cross section of the base 54 and the light source holder 551 cut in a plane parallel to the X-Y plane.

Since the three light source holders 551 have the same shape, description will be given only on one light source holder 551.

As shown in FIGS. 9, 10 and 12, the light source holder 551 includes a holder main body 5511, a lid member 5512 (FIGS. 9 and 10) and a pair of plates 5513 (FIG. 12).

The holder main body 5511 is a heat conductive metal member. Although not shown in the figures, the holder main body 511 is a box-like parallelepiped member with an open surface (in the X-axis direction).

As shown in FIG. 12, the holder main body 5511 includes an inlet port 5511A for introducing the cooling liquid into space 5511D and an outlet port 5511B for letting the cooling liquid from inside to the outside in a lower side surface (a one end surface).

As shown in FIGS. 9, 10 and 12, the holder main body 5511 includes a pair of attaching portions 5511C extending apart from each other along the lower side surface.

The lid member 5512 is a heat conductive metal member for holding the light source device 31 in a heat transferable manner. The lid member 5512 has a slightly larger shape than that of the opening of the holder main body 5511, the lid member 5512 closing the opening of the holder main body 5511. Specifically, as shown in FIG. 12, attaching the lid member 5512 to the holder main body 5511 defines the space 5511D enclosed by the holder main body 5511 and the lid member 5512.

The plurality of plates 5513 are heat conductive metal members, the plates 5513 being disposed in the space 5511D inside the holder main body 5511 as shown in FIG. 12. More specifically, the plates 5513 may have a thickness of several tens to several hundreds of micrometers similarly to the plates 4512 described in the fifth exemplary embodiment. As shown in FIG. 12, the plates 5513 are provided between the lid member 5512 and the bottom surface of the box-like shape of the holder main body 5511 (the surface opposite to the light source device 31) so as to be in parallel to the X-Z plane with a distance of approximately several tens to several hundreds of micrometers to each other. The plates 5513 are connected to the holder main body 5511 and the lid member 5512 in a heat transferable manner.

As shown in FIG. 12, the above-described light source holder 551 is positioned at a predetermined position on the base 54 by engaging the lower side surface of the holder main body 551 into the recess 5414 in the base 54 via an elastic member 5514 (made of, for example, rubber) having the same shape as the lower side surface of the light source holder 551 (except for the inflow port 5511A and the outflow port 5511B), the light source holder 551 being fixed on the base 54 by the fixing screws 5515 which are screwed via the pair of attaching portions 5511C of the holder main body 5111 into the screw holes 5414A in the base 54. In this state, the space 5511D and the base side flow passages 54A are in communication via the inflow port 5511A and the outflow port 5111B of the light source holder 551. As shown in FIG. 12, the cooling liquid flowing in the base side flow passage 54A is introduced into the space 5511D via the through holes 5413C and the inflow port 5511A. In the space 5511D, the cooling liquid flows spaces between the plates 5513 as shown in FIG. 12 like in the fifth exemplary embodiment. As shown in FIG. 12, the cooling liquid flowing in the space 5511D is returned to the base side flow passage 54A via the outflow port 5511B and the through holes 5413C. Thus, similarly to the fifth exemplary embodiment, the inflow port 5511A, the outflow port 5511B and the space 5511D form the holder side flow passages 451A (FIG. 12) for the cooling liquid to flow inside the light source holder 551.

Like the light source holder 451 described in the fifth exemplary embodiment, the light source holder 551 may be a so-called heat exchanger such as a microchannel.

The pump 56 has the similar function to that of the pump 36 described in the first exemplary embodiment but differs therefrom only in the shape. Specifically, projected from a one end surface (which is orthogonal to the horizontal surface) is a pair of flow portions for sucking and sending the cooling liquid (FIG. 10). The pair of flow portions 561 are inserted into the through holes 5413A of the base 54. The pump 56 is accommodated in the first accommodation portion 5411 and the second accommodation portion 5421. Thus, the base 54 supports and fixes the pump 56 on the base 54. In this state, the pump 56 is disposed on the flow passage of the base side flow passages 54A (FIG. 11) and the holder side flow passages 451A (FIG. 12), 352A (see FIG. 3), and the cooling liquid in the flow passage can be sucked and sent via the pair of flow portions 561 by the drive of the pump 36. As shown in FIG. 9, the rod integrator 38 on the green color side is disposed so as to planarly interfere with the pump 56, that is, so as to be on the upper side of the pump 56 when the projector 1D is assembled.

The heat releasing unit 57 has the similar function to that of the heat releasing unit 37 described in the first exemplary embodiment but differs therefrom only in the shape of a radiator 571. Specifically, the radiator 571 does not include the pair of flow portions 3711 described in the first exemplary embodiment. As shown in FIG. 10, the radiator 571 is fixed with the lower side surface abutting on the base 54, so that the radiator 571 is supported and fixed on the base 54. In this state, the radiator 571 is disposed on the flow passage through the base side flow passages 54A (FIG. 11) and the holder side flow passages 451A (FIG. 12), 352A (FIG. 3).

Next, how the cooling liquid circulates in the sixth exemplary embodiment will be described below with reference to FIG. 11. In the description below, the three light source holders 551 on the red, green and blue color light sides are respectively called the light source holder 351R, the light source holder 351G and the light source holder 351B for easy description as shown in FIGS. 9 and 11. Similarly to the first exemplary embodiment, the three panel holders 352 are respectively called the panel holder 352R, the panel holder 352G and the panel holder 352B.

In the sixth exemplary embodiment, by connecting the light source holders 551, the panel holders 352, the pump 56, and the radiator 571 relative to the base 54, the light source holders 551, the panel holders 352, the pump 56, and the radiator 571 are tandemly connected via the base side flow passages 54A (FIG. 11) and the holder side flow passages 451A (FIG. 12).

By driving the pump 56, the cooling liquid is sent to the base side flow passages 54A from the pump 56.

The cooling liquid flown into the base side flow passage 54A flows into the holder side flow passages 451A in the light source holder 551R. Herein, the heat generated by the drive of the LED module 31R is transferred to the cooling liquid flowing in the holder side flow passages 451A via the light source holder 351R.

The cooling liquid flowing in the holder side flow passages 451A in the light source holder 5511B flows to the base side flow passage 34A to flow into the radiator 571. Herein, heat in the cooling liquid flowing in the radiator 571 is released via the radiator 571 to the outside, and the released hot air is exhausted to the outside of the projector 1 by the drive of the cooling fan 372.

The cooling liquid flowing in the radiator 571 flows to the base side flow passage 54A substantially similarly to the first exemplary embodiment, then flows through the base side flow passage 54A, the holder side flow passage 352A in the panel holder 352R, the base side flow passage 54A, the holder side flow passage 352A in the panel holder 352G, the base side flow passage 54A, the holder side flow passage 352A in the panel holder 352G, the base side flow passage 54A, the holder side flow passage 352A in the panel holder 352B. Herein, heat in the liquid crystal light valves 32 generated by irradiations of light beams from the light source devices 31 is transferred to the cooling liquid flowing in the holder side flow passages 352A via the panel holders 352.

The cooling liquid flowing in the holder side flow passage 352A in the panel holder 352B flows to the base side flow passage 54 to flow into the holder side flow passages 451A in the light source holder 551G. Herein, heat generated by the drive of the green color LED module (not shown) is transferred to the cooling liquid flowing in the holder side flow passages 451A via the light source holder 551G.

The cooling liquid flowing in the holder side flow passage 451A in the light source holder 551G to the base side flow passage 54A to flow into the holder side flow passages 451A in the light source holder 551B. Herein, heat generated by the drive of the blue color LED module (not shown) is transferred to the cooling liquid flowing in the holder side flow passages 451A via the light source holder 5511B.

The cooling liquid flowing in the holder side flow passages 451A in the light source holder 551B flows to the base side flow passage 54A. Then, the cooling liquid is sucked into (returns into) the pump 56.

As described above, the cooling liquid circulates through the pump 56, the light source holder 551R, the panel holder 352R, the panel holder 352G, the panel holder 352B, the light source holder 551G, the light source holder 551B and the pump 56 via the base side flow passages 54A and the holder side flow passages 451A, 352A.

In addition to the advantages same as the first and fifth exemplary embodiments, the sixth exemplary embodiment further includes following advantages.

Similarly to the fifth exemplary embodiment, when the pair of fluid passing portions 4513 (the tubular members) are provided to the light source holder 451 such that the base side flow passage 34A of the base 34 and the holder side flow passage 451A of the light source holder 451 are in communication via the pair of fluid passing portions 451, the flow passage becomes narrow in the pair of fluid passing portions 4513 while the cooling liquid flows between the base side flow passage 34A and the space 4511G, which causing pressure loss in the pair of fluid passing portions 4513. In other words, it is difficult to flow the cooling liquid at an appropriate speed in the flow passage through the base side flow passage 34A and the holder side flow passages 451A, 352A. Hence, it is difficult to effectively cool the optical elements 31, 32. Also similarly to the fifth exemplary embodiment, when the radiator 371 is provided with the pair of the fluid passing portions 3711 (the tubular members) such that the inside of the radiator 371 and the base side flow passage 34A are in communication via the pair of fluid passing portions 3711, the pair of fluid passing portions 3711 may also cause the pressure loss.

In contrast, in the sixth exemplary embodiment, the light source holder 551 is adapted such that the lower side surface having the inflow port 5511A and the outflow port 5511B is engaged with the recess 5414 in the base 54 to establish a communication between the holder side flow passages 451A and the base side flow passage 34A. Thereby, it is not necessary to provide the pair of fluid passing portions to the light source holder 551 and the pressure loss in the flow passage through the base side flow passage 34A and the holder side flow passages 451A, 352A.

The radiator 571 is also adapted such that the lower side surface abuts on the base 54 in order to communicate the inside of the radiator 571 and the base side flow passage 34A. Thereby, it is not necessary to provide the pair of flow portions to the radiator 571 and the pressure loss in the flow passage of the base side flow passage 34A and the holder side flow passages 451A, 352A.

Accordingly, it is possible to flow the cooling liquid at an appropriate speed in the flow passage of the base side flow passage 34A and the holder side flow passages 451A, 352A. Hence, it is possible to effectively cool the optical elements 31, 32.

Since the pump 56 is accommodated in the first accommodation portion 5411 and the second accommodation portion 5421 of the base 54, space above the base 54 can be effectively used as compared with the arrangement like the first and fifth exemplary embodiments, in which the pump 36 is mounted on the base 34. Hence, it is possible to dispose a component (the green light rod integrator 38) of the projector 1D so as to planarly interfere with the pump 56, thereby enhancing flexibility in design of the projector 1D as well as downsizing the projector 1D.

Seventh Exemplary Embodiment

A seventh exemplary embodiment of the invention will be described below with reference to the attached drawings.

In the description below, the same reference numerals will be attached to structures and components same as the first exemplary embodiment to omit or simplify explanation.

Figure 13:
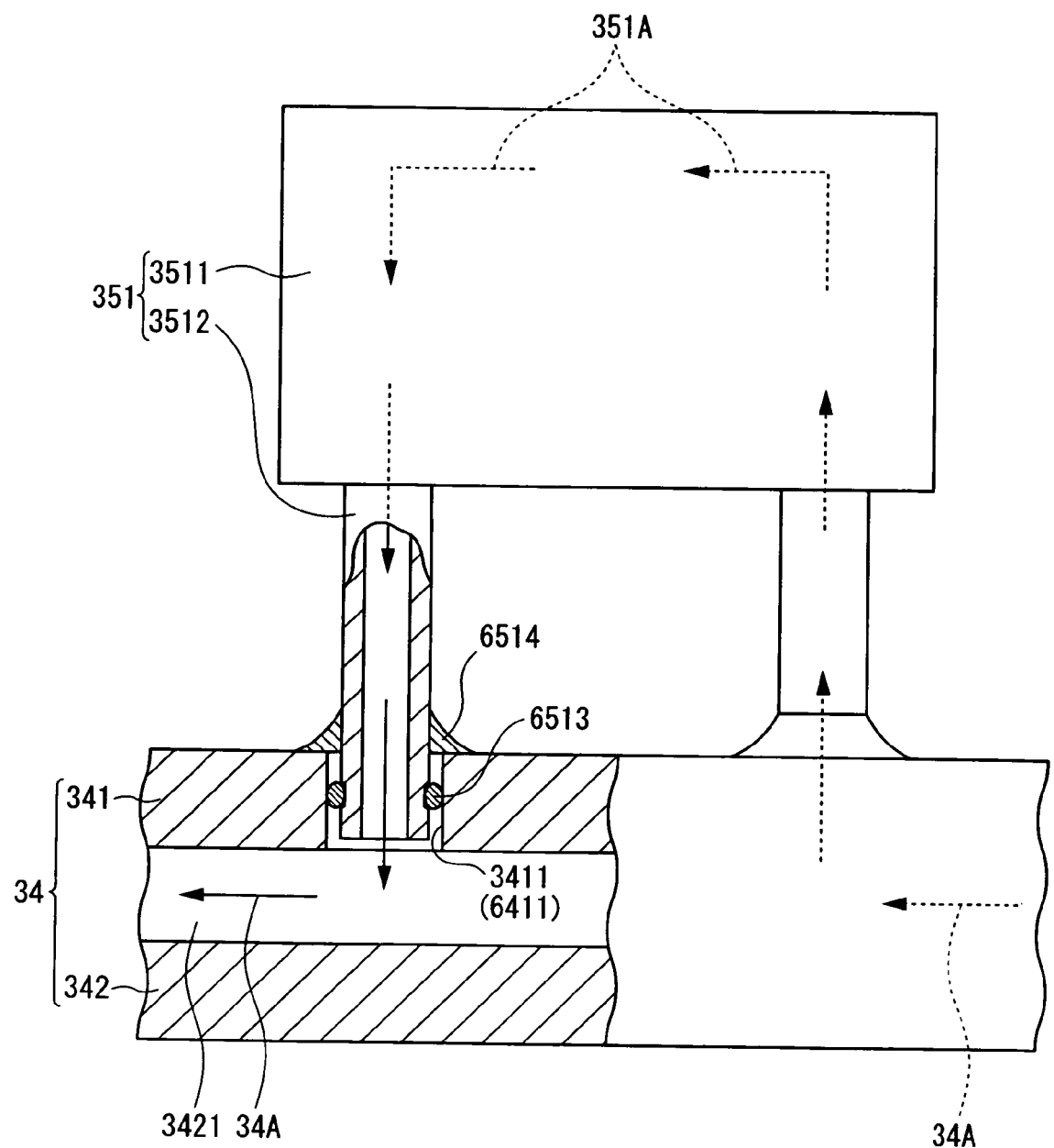
FIG. 13 schematically shows a structure for adjusting a position of a light source holder relative to a base according to a seventh exemplary embodiment of the invention.

FIG. 13 schematically shows a structure for adjusting a position of the light source holder 351 relative to the base 34 according to the seventh exemplary embodiment. FIG. 13 is a cutaway with a portion of the base 34 and the light source holder 351 are removed for easy description.

In the first exemplary embodiment, the light source device 31 can be appropriately positioned at a predetermined position on the base 34 only by inserting the both end portions 3512A of the light source device 351 into the through holes 3411 due to the length of the both end portions 3512A in the projecting direction and the shape of the through holes 3411 of the base 34.

In contrast, in the seventh exemplary embodiment, positions of the light source holder 351 and the base 34 can be relatively adjusted because the light source device 351 and the base 34 are connected to each other and the holder side flow passage 351A is in communication with the base side flow passage 34A. In other words, the light source holder 351 and the base 34 are adapted to adjust the position of the light source device 31 relative to the base 34. The other arrangements are the same as the first exemplary embodiment.

In the seventh exemplary embodiment, through holes 6411 (the base side connector) to be connected with the fluid passing portion 3512 (the holder side connector) of the light source holder 351 out of the plurality of through holes 3411 of the first plate member 341 are larger than the shape of the fluid passing portion 3512 as shown in FIG. 13.

By the above-described arrangement, the position of the light source device 31 can be adjusted as described below.

As shown in FIG. 13, firstly, O-rings 6513 being elastic members made of, for example, rubber are attached to tips of the both end portions of the fluid passing portion 3512. The tips are then disposed in the through holes 6411 with the O-rings 6513. In this state, the O-rings 6513 close a gap between the through hole 6411 and the fluid passing portion 3512. By moving the fluid passing portion 3512 in the through hole 6411, the light source holder 351 can be moved in the horizontal direction in FIG. 13 (the direction orthogonal to the inserting direction of the fluid passing portion 3512 into the through hole 6411) with the O-ring 6513 closing the gap between the through hole 63411 and the fluid passing portion 3512. By moving the fluid passing portion 3512 in the through hole 6411, the light source holder 351 can be moved in the horizontal direction in FIG. 13 (the direction orthogonal to the direction in which the fluid passing portion 3512 is inserted into the through hole 6411) with the O-ring 6513 closing the gap between the through hole 6411 and the fluid passing portion 3512.

As describe above, the spatial position of the light source device 31 held by the light source holder 351 can be adjusted by adjusting the spatial position of the light source holder 351 relative to the base 34.

The adjustment of the spatial position of the light source devices 31 relative to the base 34 may be conducted in a following manner.

Firstly, the liquid crystal light valves 32 and the cross dichroic prism 33 and the like are set on the base 34 in advance. The light source holders 351 are set on the base 34 via the above-described O-rings 6513.

The light source device 31 held by the light source holder 351 is turned on. The light source holder 351 is positioned by adjusting the spatial position of the light source holder 351 relative to the base 34 while measuring a light beam irradiated through the liquid crystal light valve 32 and the cross dichroic prism 33 and the like such that the brightness (the illumination intensity) of the light beam becomes maximum.

As shown in FIG. 13, the gaps between the fluid passing portion 3512 and the through holes 6411 are closed to fix using an adhesive 6514.

By position-adjusting and fixing the light source holder 351 relative to the base 34, the base side flow passage 34A of the base 34 is brought into communication with the holder side flow passage 351A of the light source holder 351 via the fluid passing portion 3512 as shown in FIG. 13.

In addition to the advantages same as the first exemplary embodiment, the seventh exemplary embodiment further includes following advantages.

Like in the first exemplary embodiment, when the both end portions 3512A of the light source holder 351 and the through holes 3411 of the base 34 are connected and the light source device 31 is positioned at a predetermined position relative to the base 34 on the basis of the contour, the light source device 31 needs to be appropriately positioned relative to the light source holder 351, which may complicate the attaching work of the light source device 31 relative to the light source holder 351. Especially, since each light source device 31 may have a different illumination distribution of the irradiated light beam, it is difficult to appropriately position the light source device 31 relative to the light source holder 351 such that the light beam is appropriately irradiated to the liquid crystal light valve 32 (the irradiation target).

In the seventh exemplary embodiment, the light source holder 351 and the base 34 are adapted such that the relative positions of the light source holder 351 and the base 34 can be adjusted. Accordingly, it is not necessary to appropriately position the light source device 31 relative to the light source holder 351, but the light source device 31 can be positioned at an appropriate position relative to the base 34 only by adjusting the spatial position of the light source holder 351 relative to the base 34. Hence, such arrangement can make the attaching work of the light source device 31 relative to the light source holder 351 less complicated. In addition, the light source device 31 can be easily positioned such that the light beam is appropriately irradiated to the to-be-irradiated liquid crystal light valve 32 (the irradiation target) by adjusting the spatial position of the light source holder 351 relative to the base 34.

Note that the both end portions 3512 and the through holes 6411 in which the tips of the both end portions of the fluid passing portion 3512 can be loosely disposed form the structure for adjusting the position of the light source holder 351 relative to the base 34, thereby contributing the simplifying of the structure in the seventh exemplary embodiment.

Eighth Exemplary Embodiment

An eighth exemplary embodiment of the invention will be described below with reference to the attached drawings.

In the description below, the same reference numerals will be attached to structures and components same as the first and seventh exemplary embodiment to omit or simplify explanation.

Figure 14:
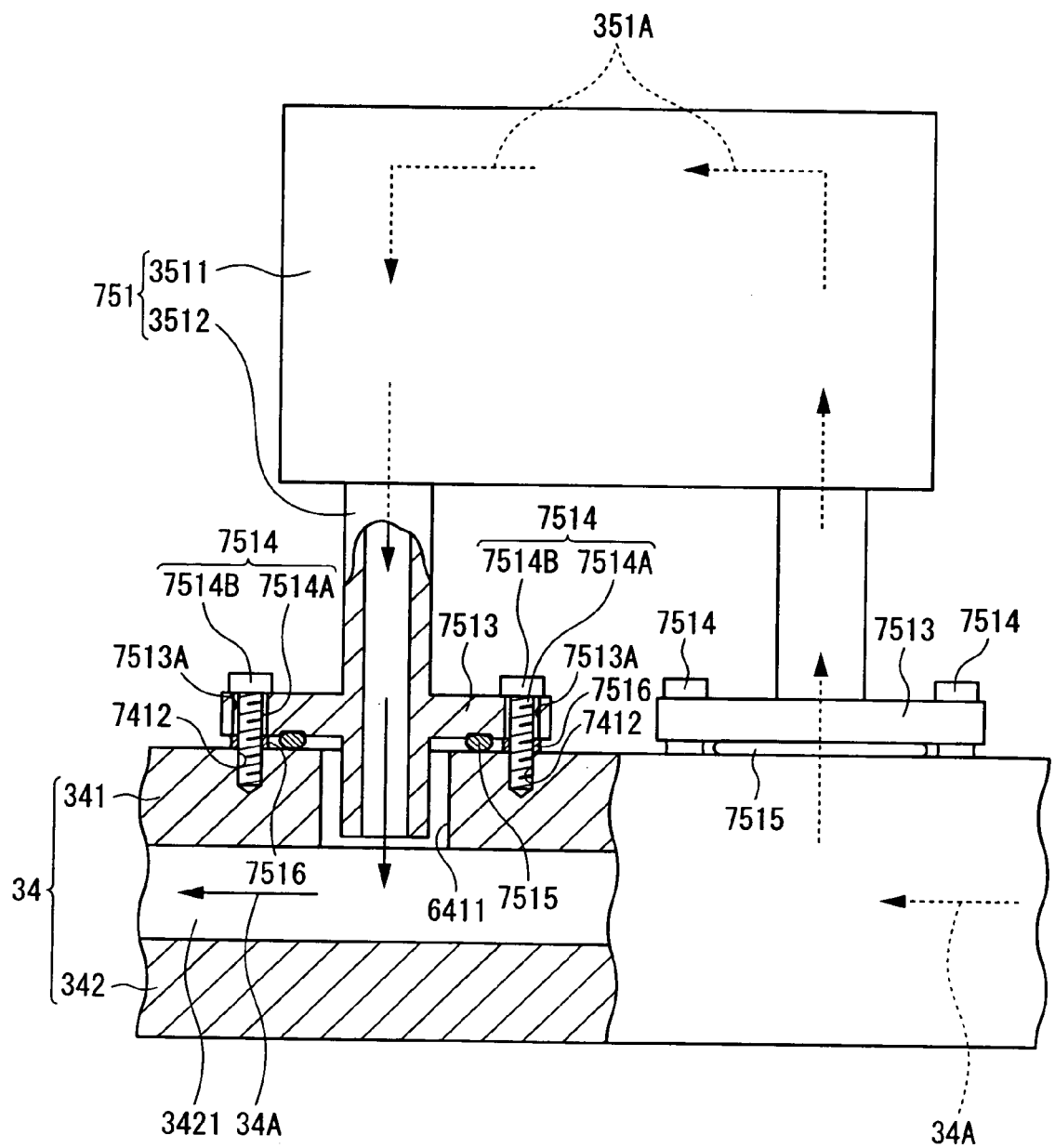
FIG. 14 schematically shows a structure for adjusting a position of a light source holder relative to a base according to an eighth exemplary embodiment of the invention.

FIG. 14 schematically shows a structure for adjusting a position of a light source holder 751 relative to the base 34 according to the eighth exemplary embodiment. FIG. 14 is a cutaway with a portion of the base 34 and the light source holder 751 are removed for easy description.

The eighth exemplary embodiment is different from the seventh exemplary embodiment only in that flanges 7513 are integrally provided to the tips of the both end portions of the fluid passing portion 3512 of the light source holder 751. The other arrangements are the same as the seventh exemplary embodiment.

As shown in FIG. 14, the flanges 7513 have the same shape and are integrally formed so as to extend from circumferential portions of the fluid passing portion 3512 to the outside. As shown in FIG. 14, the flange 7513 becomes opposite to a peripheral portion of the through hole 6411 when the both end portions of the fluid passing portion 3512 are inserted in the through holes 6411.

As shown in FIG. 14, the flange 7513 has a plurality of fixing holes 7513A for fixing the light source holder 751 relative to the base 34, the fixing holes 7513A extending in the vertical direction. As shown in FIG. 14, the plurality of fixing holes 7513A are larger than screw portions 7514A of a plurality fixing screws 7514 but are smaller than screw heads 7514B.

As shown in FIG. 14, in the eighth exemplary embodiment, the base 34 is provided with a plurality of screw holes 7412 corresponding to the plurality of fixing holes 7513A of the flange 7513, the screw holes 7412 being screwed in the plurality of fixing screws 7414.

By the above-described arrangement, the position of the light source device 31 can be adjusted as described below.

As shown in FIG. 14, the tips of the both end portions of the fluid passing portion 3512 are loosely disposed in the respective through holes 6411 with O-rings 7515 between the flange 7513 and the vicinities of the through holes 6411, the O-rings 7515 being elastic members made of, for example, rubber and having a larger contour than the through holes 6411. As shown in FIG. 14, the plurality of fixing screws 7514 are inserted into the plurality of fixing holes 7513A of the flange 7513 so as to be screwed into the plurality of screw holes 7412. In this state, the flanges 7513 and the O-rings 7515 close the gaps between the through holes 6411 and the fluid passing portion 3512. Owing to the gaps between the through holes 6411 and the fluid passing portion 3512 and the gaps between the plurality of fixing holes 7513A and the screw portions 7514A of the plurality of fixing screws 7514, by moving the fluid passing portion 3512 in the horizontal direction in FIG. 14 (the direction orthogonal to the direction in which the fluid passing portion 3512 is inserted in the through holes 6411), the light source holder 751 can be moved in the horizontal direction in FIG. 14 relative to the base 34 with the gaps between the through holes 6411 and the fluid passing portion 3512 closed with the flanges 7513 and the O-rings 7515. In addition, by changing the screwing state between the plurality of fixing screws 7514 and the plurality of screw holes 7412, the light source holder 751 can be moved in the vertical direction in FIG. 14 (the direction in which the fluid passing portion 3512 is inserted in the through holes 6411) relative to the base 34 together with the flanges 7513 and the fluid passing portion 3512 with the gaps between the through holes 6411 and the fluid passing portion 3512 closed with the flanges 7513 and the O-rings 7515.

As describe above, the spatial position of the light source device 31 held by the light source holder 751 can be adjusted by adjusting the spatial position of the light source holder 751 relative to the base 34.

Similarly to the seventh exemplary embodiment, when adjusting the spatial position of the light source device 31 relative to the base 34, the spatial position of the light source holder 751 is adjusted relative to the base 34 as described above such that the brightness (the illumination intensity) of the light beam that is irradiated from the light source device 31 and passed through the liquid crystal light valve 32 and the cross dichroic prism 33 and the like becomes maximum. Subsequently, the plurality of fixing screws 7514 are fixed to the base 34 and the flanges 7513 using an adhesive 7516 as shown in FIG. 14.

By position-adjusting and fixing the light source holder 751 relative to the base 34, the base side flow passage 34A of the base 34 is brought into communication with the holder side flow passage 351A of the light source holder 751 via the fluid passing portion 3512 as shown in FIG. 14.

In addition to the advantages same as the seventh exemplary embodiment, the eighth exemplary embodiment further includes following advantages.

In the eighth exemplary embodiment, the flanges 7513 are integrally formed on the tips of the both end portions of the fluid passing portion 3512, and the flanges 7513 can be connected to the vicinities of the through holes 6411. Accordingly, by connecting the flanges 7513 to the vicinities of the through holes 6411 after adjusting the spatial position of the light source holder 751, the fixing state of the light source holder 751 relative to the base 34 can be appropriately maintained as compared with the arrangement of the seventh exemplary embodiment, in which no flanges 7513 are provided, thereby preventing a positional displacement of the light source device 31 relative to the base 34.

In the seventh exemplary embodiment, when the fluid passing portion 3512 is moved in the horizontal direction in FIG. 13 inside the through holes 6411 in the adjustment of the spatial position of the light source holder 351 relative to the base 34, crushing amounts of the O-rings 6513 may vary depending on positions. Specifically, when the fluid passing portion 3512 is moved extremely close to the inner peripheral surfaces of the through holes 6411, the cooling liquid flowing in the base side flow passage 34A may leak via the through holes 6411 to the outside. In contrast, the eighth exemplary embodiment employs the arrangement in which the gaps between the through holes 6411 and the fluid passing portion 3512 are closed by the O-rings 7515 disposed between the flanges 7513 and the base 34. Hence, even when the fluid passing portion 3512 is moved in the horizontal direction in FIG. 14 in the through holes 6411, the crushing amounts of the O-rings 7515 can be maintained constant. Therefore, it is possible to reliably prevent the cooling liquid flowing in the base side flow passage 34A from leaking via the through holes 6411 to the outside.

Ninth Exemplary Embodiment

A ninth exemplary embodiment of the invention will be described below with reference to the attached drawings.

In the description below, the same reference numerals will be attached to structures and components same as the eighth exemplary embodiment to omit or simplify explanation.

Figure 15:
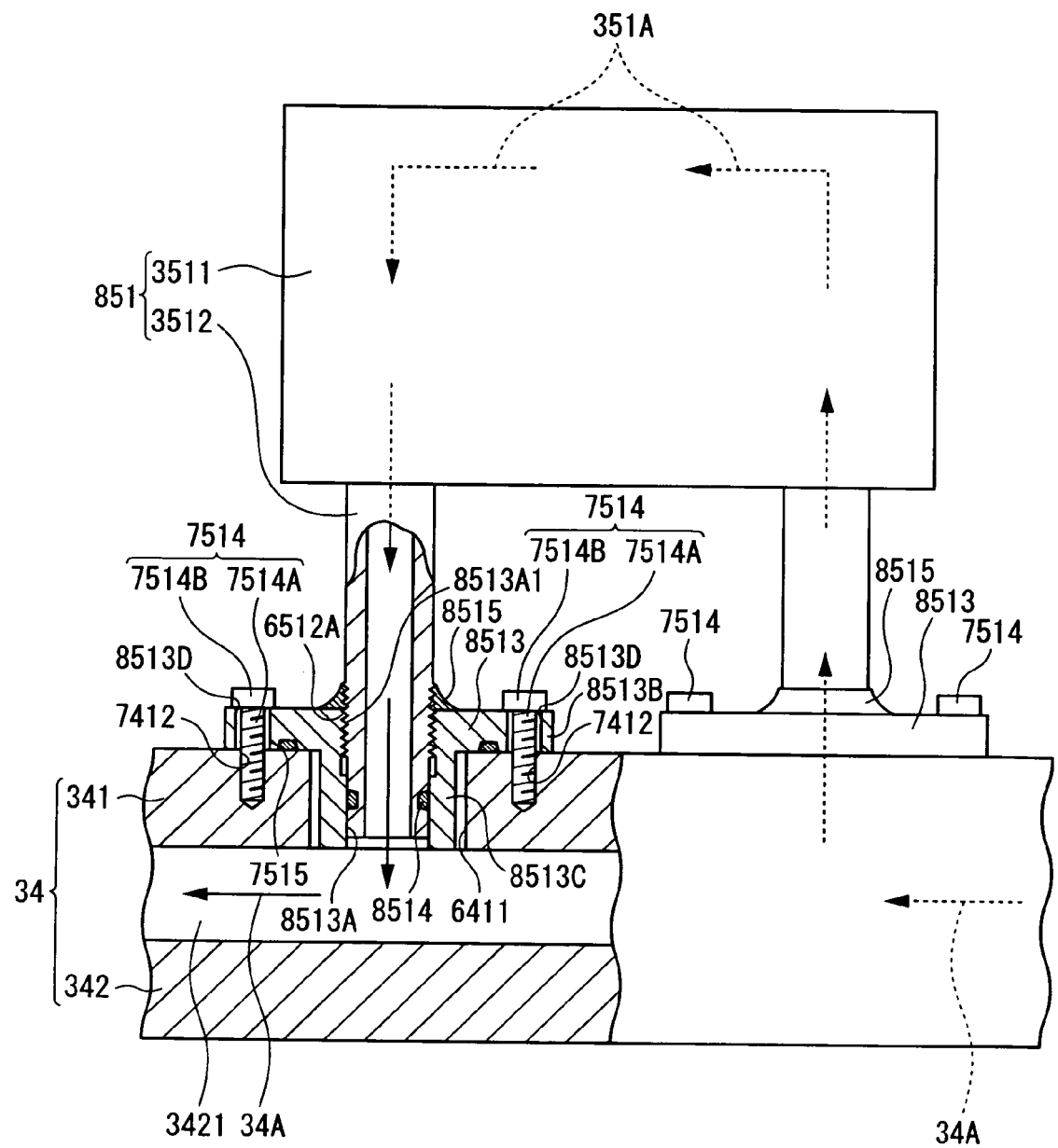
FIG. 15 schematically shows a structure for adjusting a position of a light source holder relative to a base according to a ninth exemplary embodiment of the invention.

FIG. 15 schematically shows a structure for adjusting a position of a light source holder 851 relative to the base 34 according to the ninth exemplary embodiment. FIG. 15 is a cutaway with a portion of the base 34 and the light source holder 851 are removed for easy description.

In the eighth exemplary embodiment, the flanges 7513 is integrally formed on the fluid passing portion 3512.

In contrast in the ninth exemplary embodiment as shown in FIG. 15, flanges 8513 are provided to the fluid passing portion 3512 as a separate component. The other arrangements are the same as the eighth exemplary embodiment.

In the ninth exemplary embodiment, as shown in FIG. 15, threaded grooves 6512A for screwing with the flanges 8513 are formed at the tips of the both end portions of the fluid passing portion 3512.

As shown in FIG. 15, two flanges 8513 of the same shape are respectively provided to the both end portions of the fluid passing portion 3512. As shown in FIG. 15, the flanges 8513 are formed in a substantially cylindrical shape extending in the vertical direction. The flanges 8513 have insertion holes 8513A to receive the tips of the both end portions of the fluid passing portion 3512. The flange 8513 includes a thick portion 8513B having substantially the same shape as the flanges 7513 of the first exemplary embodiment and a thin portion 8513C having a contour smaller than the contour of the thick portion 8513B and smaller than the hole shape of the through hole 6411 of the base 34, the thin portion 8513B extending from the lower side surface of the thick portion 8513B toward the lower side.

As shown in FIG. 15, provided in the inner peripheral surface of the thick portion 8513B (the upper side of the inner peripheral surface) in the insertion hole 8513A is a threaded groove 8513A1 to be engaged with the threaded groove 6512A of the fluid passing portion 3512.

In the ninth exemplary embodiment, as shown in FIG. 15, similarly to the plurality of fixing holes 7513A of the eighth exemplary embodiment, a plurality of fixing holes 8513D formed in the flanges 8513 has a width in the horizontal direction in FIG. 15 (the direction orthogonal to the direction in which the fluid passing portion 3512 is inserted into the through holes 6411), the width being larger than the screw portions 7514A of the plurality of fixing screws 7514 and smaller than screw heads 7514B of the plurality of fixing screws 7514. Although not shown in detail in the figures, the plurality of fixing holes 8513D have an arc shape in plan view around the cylindrical axis of the flange 8513. The plurality fixing holes 8513D are track holes capable of rotating the flanges 8513 around the cylindrical axis with the plurality of fixing screws 7514 inserted.

Note that the number of the fixing holes 8513D to be provided is not limited to plural but may be one when the fixing hole 8513D is formed in a circular shape in plan view.

By the above-described arrangement, the position of the light source device 31 can be adjusted as described below.

As shown in FIG. 15, firstly, O-rings 8514 being elastic members made of, for example, rubber are attached to the tips of the both end portions of the fluid passing portion 3512. The tips of the both end portions of the fluid passing portion 3512 are then disposed in the through holes 8513A with the O-rings 8514 in order to engage the fluid passing portion 3512 with the flanges 8513 with the screw grooves 6512A, 8513A. In this state, the O-rings 8514 close the gaps between the tips of the both end portions of the fluid passing portion 3512 and the insertion holes 8513A of the flanges 8513.

Similarly to the eighth exemplary embodiment, as shown in FIG. 15, the tips of the both end portions of the fluid passing portion 3512 and the thin portions 8513C of the flanges 8513 are loosely disposed in the through holes 6411 with the O-rings 7515 disposed between the flanges 8513 and the vicinities of the through holes 6411.

As shown in FIG. 15, the plurality of fixing screws 7514 are inserted into the plurality of fixing holes 8513D of the flanges 8513 so as to be loosely screwed into the plurality of screw holes 7412. In this state, the thick portions 8513B and the O-rings 7515 close the gaps between the through holes 6411 and the thin portions 8513C. Owing to the gaps in the horizontal direction in FIG. 15 between the plurality of fixing holes 8513D and the screw portions 7514A of the plurality of fixing screws 7514, by moving the fluid passing portion 3512 and the flanges 8513 in the horizontal direction in FIG. 15, the light source holder 851 can be moved in the horizontal direction in FIG. 15 relative to the base 34 with the gaps between the through holes 6411 and the thin portions 8513C closed with the thick portions 7513 and the O-rings 7515. In addition, by changing the screwing state between the screw grooves 6512A and 8513A1 by rotating the flanges 8513 around the cylindrical axis, the flanges 8513 (the fluid passing portion 3512 and the light source holder 851) can be moved in the vertical direction in FIG. 15 with the gaps between the fluid passing portion 3512 and the insertion holes 8513A of the flanges 8513 closed with the O-rings 8514.

As describe above, the spatial position of the light source device 31 held by the light source holder 851 can be adjusted by adjusting the spatial position of the light source holder 851 relative to the base 34.

Similarly to the eighth exemplary embodiment, when adjusting the spatial position of the light source device 31 relative to the base 34, the spatial position of the light source holder 851 is adjusted relative to the base 34 as described above such that the brightness (the illumination intensity) of the light beam that is irradiated from the light source device 31 and passed through the liquid crystal light valve 32 and the cross dichroic prism 33 and the like becomes maximum.

Subsequently, the plurality of fixing screws 7514 are tightened into the plurality of screw holes 7412. As shown in FIG. 15, the fluid passing portion 3512 and the flanges 8513 are fixed using the adhesive 8515.

By position-adjusting and fixing the light source holder 851 relative to the base 34, the base side flow passage 34A of the base 34 is brought into communication with the holder side flow passage 351A of the light source holder 851 via the fluid passing portion 3512 as shown in FIG. 15.

In addition to the advantages same as the eighth exemplary embodiment, the ninth exemplary embodiment further includes following advantages.

In the ninth exemplary embodiment, since the flanges 8513 are provided to the fluid passing portion 3512 as a separate component, the flanges 8513 are not moved in accordance with the movement of the fluid passing portion 3512 when position-adjusting the light source holder 851 in the vertical direction in FIG. 15 relative to the base 34. In other words, the flanges 8513 can be in contact with the vicinities of the through holes 6411. Therefore, the O-rings 7515 and the flanges 8513 can reliably prevent the cooling liquid flowing in the base side flow passage 34A from leaking via the through holes 6411 to the outside.

Tenth Exemplary Embodiment

A tenth exemplary embodiment of the invention will be described below with reference to the attached drawings.

In the description below, the same reference numerals will be attached to structures and components same as the ninth exemplary embodiment to omit or simplify explanation.

Figure 16:
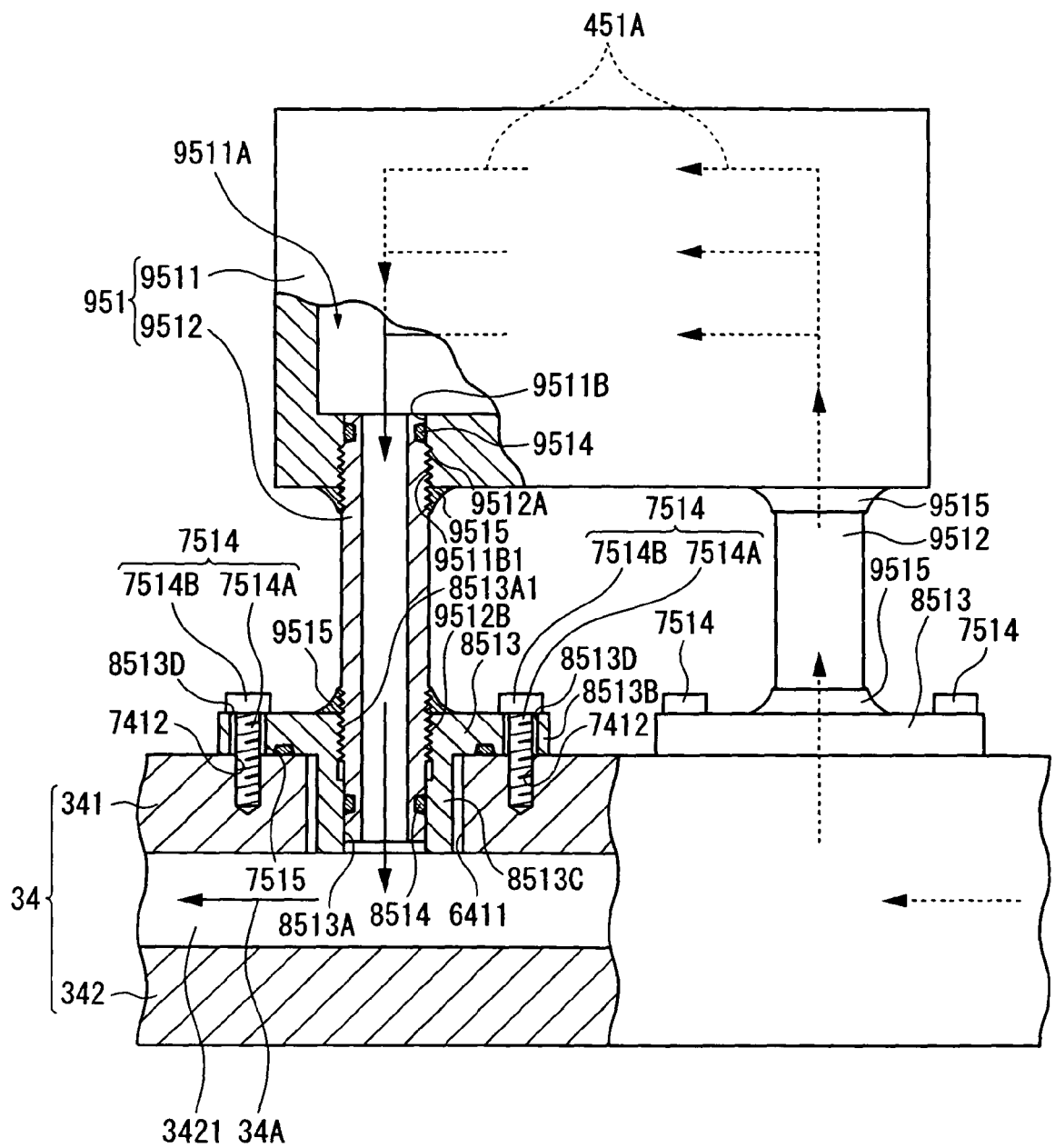
FIG. 16 schematically shows a structure for adjusting a position of a light source holder relative to a base according to a tenth exemplary embodiment of the invention.

FIG. 16 schematically shows a structure for adjusting a position of a light source holder 951 relative to the base 34 according to the tenth exemplary embodiment. FIG. 16 is a cutaway with a portion of the base 34 and the light source holder 951 are removed for easy description.

In the ninth exemplary embodiment, the fluid passing portion 3512 of the light source holder 851 is fixed to the plate body 3511.

In contrast in the tenth exemplary embodiment as shown in FIG. 16, two fluid passing portions 9512 are provided to the light source holder 951, the fluid passing portions 9512 being screwed and connected to an element holder main body 9511. The other arrangements are the same as the ninth exemplary embodiment.

The element holder main body 9511 is a heat conductive metal member for holding the light source device 31. The element holder main body 9511 may have an arrangement similar to the fifth exemplary embodiment including the outer frame 4511 and the plurality of plates 4512 or the arrangement of the sixth exemplary embodiment including the light source holder 551. As shown in FIG. 16, the element holder main body 9511 is a heat exchanger such as a microchannel in which a plurality of plates (similar to the plates 4512, 5513, not shown) are disposed in a space 9511A.

As shown FIG. 16, provided in the lower side surface of the element holder main body 9511 are insertion holes 9511B for establishing a communication between the space 9511A and the outside and for inserting the fluid passing portions 9512. As shown in FIG. 16, provided in bottom-side inner peripheral surfaces of the insertion holes 9511B are screw grooves 9511B1 for engaging with the fluid passing portions 9512.

The fluid passing portions 9512 are tubular members having the same substantially cylindrical shape. As shown in FIG. 16, each of the fluid passing portions 9512 includes a screw groove 9512A which is formed in an outer peripheral surface of one end to be engaged with a screw groove 9511B1 of the element holder main body 9511 and a screw groove 9512B which is formed in the outer peripheral surface of the other end to be engaged with the screw groove 8513A1 of the flange 8513.

Note that the element holder main body 9511 and the fluid passing portions 9512 are adapted such that the screw structure of the screw grooves 9511B1, 9512A are one of the right-hand tread screw structures and the left-hand thread screw structure. The right-hand thread screw structure is a screw structure in which when the fluid passing portion 9512 is rotated clockwise around the cylindrical axis while seeing an object into which the fluid passing portion 9512 screwed from the fluid passing portion 9512 side, the fluid passing portion 9512 is moved toward the element holder main body 9511 side. The left-hand thread screw structure is a screw structure in which when the fluid passing portion 9512 is rotated counterclockwise around the cylindrical axis while seeing an object into which the fluid passing portion 9512 screwed from the fluid passing portion 9512 side, the fluid passing portion 9512 is moved toward the element holder main body 9511 side.

The fluid passing portions 9512 and the flanges 8513 are adapted such that the screw structures of the screw grooves 9512B, 8513A1 is the other one of the right-hand tread screw structure and the left-hand thread screw structure. Specifically, when the element holder main body 9511 and the fluid passing portions 9512 have the right-hand thread screw structure, the fluid passing portions 9512 and the flanges 8513 have the left-hand thread screw structure. When the element holder main body 9511 and the fluid passing portions 9512 have the left-hand thread screw structure, the fluid passing portion 9512 and the flanges 8513 have the right-hand thread screw structure.

Note that in the tenth exemplary embodiment, the plurality of fixing holes 8513D of the flanges 8513 screwed with the fluid passing portions 9512 are not the track holes of the eighth exemplary embodiment. The fixing holes 8513D are formed to have the same shape as the plurality of fixing holes 7513A of the seventh exemplary embodiment.

By the above-described arrangement, the position of the light source device 31 can be adjusted as described below.

As shown in FIG. 16, firstly, the O-rings 9514 being elastic members made of, for example, rubber are attached to end portions on one side of the fluid passing portions 9512. The end portions on the one side of the fluid passing portions 9512 are then inserted in the insertion holes 9511B of the element holder main body 9511 to engage the element holder main body 9511 with the fluid passing portions 9512 with the screw grooves 9511B1, 9512A. In this state, the O-rings 9514 close the gaps between the end portions on the one side of the fluid passing portions 9512 and the insertion holes 9511B of the element holder main body 9511.

Similarly to the ninth exemplary embodiment, as shown in FIG. 16, the end portions on the other side of the fluid passing portions 9512 are inserted into the insertion holes 8513A of the flanges 8513 with the O-rings 8514 attached to the end portions on the other side of the fluid passing portions 9512 to engage the fluid passing portions 9512 with the flanges 8513 with the screw grooves 9512B, 8513A1. In this state, the O-rings 8514 close the gaps between the end portions on the other side of the fluid passing portions 9512 and the insertion holes 8513A of the flanges 8513.

Similarly to the ninth exemplary embodiment, as shown in FIG. 16, the end portions on the other side of the fluid passing portions 9512 and the thin portions 8513C of the flanges 8513 are loosely disposed in the through holes 6411 with the O-rings 7515 disposed between the flanges 8513 and the vicinities of the through holes 6411.

Similarly to the ninth exemplary embodiment, as shown in FIG. 16, the plurality of fixing screws 7514 are inserted into the plurality of fixing holes 8513D of the flanges 8513 so as to be loosely screwed into the plurality of screw holes 7412. In this state, the thick portions 8513B and the O-rings 7515 close the gaps between the through holes 6411 and the thin portions 8513C.

Owing to the gaps between the plurality of fixing holes 8513D and the screw portions 7514A of the plurality of fixing screws 7514, by moving the fluid passing portions 9512 and the flanges 8513 in the horizontal direction in FIG. 16 (the direction orthogonal to the direction in which the fluid passing portions 9512 are inserted in the through holes 6411), the light source holder 951 can be moved in the horizontal direction in FIG. 15 relative to the base 34 with the gaps between the through holes 6411 and the thin portions 8513C closed with the thick portions 8513C and the O-rings 7515. Since the element holder main body 9511 and the fluid passing portions 9512 have one of the right-hand thread screw structure and the left-hand thread screw structure while the fluid passing portions 9512 and the flanges 8513 have the other one of the right-hand thread screw structure and the left-hand thread screw structure, by rotating the fluid passing portions 9512 in a predetermined direction around the cylindrical axis, the element holder main body 9511 and the flanges 8513 can be moved toward each other with the gaps between the fluid passing portions 9512 and the insertion holes 9511B of the element holder main body 9511 closed with the O-rings 9514 and with the gaps between the fluid passing portions 9512 and the flanges 8513 closed with the O-rings 8514. In addition, by rotating the fluid passing portions 9512 in the opposite direction of the above-mentioned predetermined direction around the cylindrical axis, the element holder main body 9511 and the flanges 8513 can be moved apart from each other. Specifically, since the flanges 8513 are attached on the base 34 by the plurality of fixing screws 7514, by rotating the fluid passing portions 9512 around the cylindrical axis, the element holder main body 9511 can be moved in the vertical direction in FIG. 16.

As describe above, the spatial position of the light source device 31 held by the element holder main body 9511 can be adjusted by adjusting the spatial position of the element holder main body 9511 relative to the base 34.

Similarly to the ninth exemplary embodiment, when adjusting the spatial position of the light source device 31 relative to the base 34, the position of the light source holder 951 in the horizontal direction relative to the base 34 is adjusted as described above such that the brightness (the illumination intensity) of the light beam that is irradiated from the light source device 31 and passed through the liquid crystal light valve 32 and the cross dichroic prism 33 and the like becomes maximum. Subsequently, the plurality of fixing screws 7514 are tightened into the plurality of screw holes 7412.

Next, the position of the element holder main body 9511 in the vertical direction relative to the base 34 is adjusted as described above such that the brightness (the illumination intensity) of the light beam that is irradiated from the light source device 31 and passed through the liquid crystal light valve 32 and the cross dichroic prism 33 and the like becomes maximum. Subsequently, as shown in FIG. 16, the fluid passing portions 9512, the element holder main body 9511 and the flanges 8513 are fixed using the adhesive 9515.

By position-adjusting and fixing the light source holder 951 relative to the base 34, the base side flow passage 34A of the base 34 is brought into communication with the holder side flow passage 451A of the light source holder 951 via the fluid passing portions 9512 as shown in FIG. 16.

In addition to the advantages same as the ninth exemplary embodiment, the tenth exemplary embodiment further includes following advantages.

In the ninth exemplary embodiment, the fluid passing portions 9512 are connected with the element holder main body 9511 in one of the right-hand thread screw structure and the left-hand thread screw structure, while the fluid passing portions 9512 are connected with the flanges 8513 in the other one of the right-hand thread screw structure and the left-hand thread screw structure. Accordingly, only by rotating the fluid passing portions 9512, the light source holder 951 can be positioned in the vertical direction relative to the base 34. Therefore, the position-adjusting can be conducted more easily in a stable state as compared with, for example, the eighth exemplary embodiment in which the light source holder 851 is position-adjusted in the vertical direction in FIG. 15 relative to the base 34 by rotating the flanges 8513.

Although some aspects of the invention have been described by exemplifying the preferred exemplary embodiments, the invention is not limited to the exemplary embodiments, but includes improvements and modifications without departing from the scope of the invention.

The arrangement of the element holder 35 (the light source holder, the panel holder) is not limited to that described in the exemplary embodiments, but may be any as long as the optical element 31, 32 can be held.

As one example, the element holder 35 may be formed only by the fluid passing portion 3512, 3522 by which the optical element 31, 32 is held.

As another example, the element holder may have an opening that forms a cooling chamber when closed for sealing the cooling liquid inside. Such element holder supports the optical element 31, 32 so as to close the opening. In other words, the element holder is not limited to the arrangement in which the heat is transferred from the optical element 31, 32 via the element holder to the cooling liquid, but may have an arrangement in which the optical element 31, 32 directly contacts with the cooling liquid.

In the above-described exemplary embodiments, the base 34, 54 is formed only by two components (the first plate member 341, 541, the second plate member 342, 542). However, the base 34, 54 may be formed of three or more plate members. For example, when the base is formed of three plate members, a plate member disposed in the middle may include a penetrating portion penetrating the plate member, the penetrating portion having substantially the same shape as the grooves 3421, 5412. By holding the plate member in the middle by the other two plate members, the penetrating portion is closed to form the base side flow passage inside the base.

In the exemplary embodiments, the three light source devices 31, the three liquid crystal light valves 32 (six optical elements in total as cooled objects) are employed. However, the number of the cooled optical elements is not limited thereto, but may be any number such as two to five, or may be more than seven. The optical element that is cooled is not limited to the light source device 31 and the liquid crystal light valve 32 but may be another optical element.

Described in the first to fifth exemplary embodiments and the seventh to tenth exemplary embodiment is the arrangement in which the second plate member 342 forming the base 34 also forms a portion of the exterior casing 2. However, like in the sixth exemplary embodiment, the second plate member may be an individual component separately provided from the exterior casing. When employing this arrangement, it is preferable that the second plate member is connected to the exterior casing in a heat transferable manner. In such arrangement, the heat is released from the cooling liquid flowing in the base side flow passage via a heat transferring passage through the second plate member and the exterior casing.

Similarly, described in the sixth exemplary embodiment is the arrangement in which the second plate member forming the base 54 is an individual component separately provided from the exterior casing. However, like the first to fifth exemplary embodiments and the seventh to tenth exemplary embodiments, the second plate member may be a portion of the exterior casing.

In all of the exemplary embodiments described above, the through holes 3411, 6411 work as the base side connector, and the fluid passing portions 3512, 3522, 9512 work as the holder side connector, but the arrangement is not limited thereto. For example, the base side connector may be a tubular component and the holder side connector may be an insertion hole in which the tubular component is inserted.

In all of the exemplary embodiments, the optical elements 31, 32 may not be cooled in the described cooling sequence but may be in any order. In all of the exemplary embodiments, the element holders 351, 352, 451, 551, 751, 851, 951 are tandemly connected, since the holder side flow passages 351A, 352A, 451A and the base side flow passages 34A are in communication. However, at least two of the element holders 351, 352, 451, 551, 751, 851, 951 may be tandemly connected and the other element holders may be connected in parallel to the at least two element holders.

In the fourth exemplary embodiment, the base side flow passages 34A may be provided not only on the bottom surface side of the exterior casing 2 but also in the lateral surface side.

Described in the seventh to ninth exemplary embodiments is the arrangement in which the light source holders 351, 751, 851, 951 for holding the three light source devices 31 are position-adjustable relative to base 34. However, at least two light source holders may be provided in a manner position-adjustable relative to the base 34 and the panel holder 352 may be position-adjustable relative to the base 34. Further, the structure for adjusting the positions of the light source holders 351, 751, 851, 951 relative to the base 34 is not limited to the position adjusting structure described in the seventh to tenth exemplary embodiments. Any position adjusting structure may be employed as long as the light source holder can be position-adjusted relative to the base.

The seventh to tenth exemplary embodiments employ the structure for position-adjusting the light source holders 351, 751, 851, 951 relative to the base 34 in the arrangement of the first exemplary embodiment, the arrangement including no rod integrators or no condenser elements. However, the structure may be employed in the arrangement including the rod integrator 38 and the condenser lens 39 of the sixth exemplary embodiment.

The sixth exemplary embodiment employs the first accommodation portion 5411 and the second accommodation portion 5421 as the recess according to the invention. However, any arrangement may be employed as the recess as long as the recess is dented in the thickness direction and is communication with the base side flow passage 54A. For example, only the first accommodation portion 5411 may be employed.

In the sixth exemplary embodiment, the green light rod integrator 38 is employed as the component of the projector 1D which planarly interferes with the pump 56. However, the arrangement is not limited thereto, another component may planarly interfere with the pump 56.

In all of the exemplary embodiments, a transmissive liquid crystal panel (the liquid crystal light valve 32) is employed. However, the arrangement is not limited thereto and a reflective liquid crystal panel or a Digital Micromirror Device (a trademark of Texas Instruments Incorporated) may be employed.

In all of the exemplary embodiments, the three liquid crystal light valves 32 are employed. However, the number of the liquid crystal light valves 32 is not limited thereto, but may be one.

In all of the exemplary embodiments, only a front-type projector which projects an image in a direction for observing a screen is taken as an example, but the present invention may be applied to a rear-type projector that projects an image in a direction opposite to the direction for observing the screen.

In all of the exemplary embodiments, the optical apparatus according to aspects of the invention is a projector. However, an optical device according to an aspect of the invention may be employed for another optical apparatus that includes an optical element to be cooled.

Although the best arrangements for implementing the invention have been disclosed above, the invention is not limited to the best arrangements. Concretely, the invention is mainly illustrated and described on the specific exemplary embodiments, however, a person skilled in the art can modify the specific arrangements such as shape, material, quantity on the above-described exemplary embodiments as long as a technical idea and a scope of the invention can be achieved.

Therefore, the description limiting the shape and the material disclosed above is intended to be illustrative for easy understanding but not to limit the invention, hence the invention includes the description using a name of component without a part of or all of the limitation on the shape and the material etc.

Since an optical device according to an aspect of the invention has a simple structure and is easily assembled, the optical device can be mounted in an optical apparatus such as a projector.

What is claimed is:

1. An optical device, comprising:
    a plurality of optical elements;
    a base which supports the plurality of optical elements; and
    a plurality of element holders which can hold the plurality of optical elements and each includes a holder side flow passage for cooling liquid to flow therein, the plurality of element holders holding the plurality of optical elements to connect the plurality of optical elements and the cooling liquid flowing in the holder side flow passage in a heat transferable manner, wherein
    the base includes a plurality of plate members which are layered on each other to form at least one base side flow passage for the cooling liquid to flow therein,
    the plurality of element holders and the base can be connected to each other, so that the holder side flow passage and the at least one base side flow passage communicate with each other,
    the plurality of element holders each include a holder side connector to be in communication with the holder side flow passage and connected to the base,
    the base includes a plurality of base side connectors to be in communication with the at least one base side flow passage and connected to the plurality of element holders, and
    the holder side connector and the plurality of base side connectors are connected to each other, so that the holder side flow passage communicates with the at least one base side flow passage and the plurality of optical elements held by the plurality of element holders are positioned at predetermined positions relative to the base.

2. The optical device according to claim 1, wherein
    the holder side connector is a tubular member in which the cooling liquid can flow, and
    the base side connectors each are a through hole in which a tip end of the tubular member can be loosely disposed.

3. The optical device according to claim 1, wherein
    the holder side connector includes: a tubular member in which the cooling liquid can flow; and a flange which is integrally formed on the tubular member to extend from an outer peripheral portion of the tubular member toward the outside,
    the base side connectors each are a through hole in which a tip end of the tubular member can be loosely disposed, and
    the flange can be connected to a position in the vicinity of the through hole.

4. The optical device according to claim 1, further comprising:
    a flange, wherein
    the holder side connector is a tubular member in which the cooling liquid can flow,
    the base side connectors each are a through hole in which a tip end of the tubular member can be loosely disposed, and
    the flange in which the tubular member can be inserted extends from an outer peripheral portion of the tubular member toward the outside, and the flange being connectable to a position in the vicinity of the through hole.

5. The optical device according to claim 4, wherein
    the tubular member is screwed and connected to the flange and to an element holder main body including one of the holder side flow passage,
    the tubular member and the element holder main body have one of a right-hand thread screw structure and a left-hand thread screw structure, and
    the tubular member and the flange have the other one of the right-hand thread screw structure and the left-hand thread screw structure.

6. The optical device according to claim 1, wherein at least one of the plurality of element holders includes an inflow port for letting the cooling liquid to flow thereinto and an outflow port for letting the cooling liquid therein to flow to the outside in one end surface, the one end surface abutting on the base, so that the holder side flow passage communicates with the at least one base side flow passage.

7. The optical device according to claim 1, further comprising:
    a fluid sending unit which sucks and sends the cooling liquid, wherein
    the fluid sending unit can be connected to the base to be supported by the base, so that the cooling liquid in the at least one base side flow passage can be sucked and sent to the at least one base side flow passage.

8. The optical device according to claim 7, wherein
    the base includes a recess which is dented in a thickness direction of the base and is in communication with the at least one base side flow passage, and
    the fluid sending unit is accommodated in the recess to be supported by the base, so that the cooling liquid in the at least one base side flow passage can be sucked and sent to the at least base side flow passage.

9. The optical device according to claim 1, further comprising:
a heat releasing portion in which the cooling liquid can flow releases heat in the cooling liquid flowing therein to the outside, wherein
the heat releasing portion can be connected to the base to be supported by the base, the heat releasing unit guiding the cooling liquid in the at least one base side flow passage thereinto and guiding the cooling liquid therein to the at least one base side flow passage.

10. The optical device according to claim 1, wherein at least one of the plurality of plate members of the base is a heat conductive member.

11. An optical apparatus, comprising:
an optical device including a plurality of optical elements and a base which supports the plurality of optical elements;
an exterior casing which accommodates the optical device; and
a plurality of element holders which can hold the plurality of optical elements and each includes a holder side flow passage for cooling liquid to flow therein, the plurality of element holders holding the plurality of optical elements to connect the plurality of optical elements and the cooling liquid flowing in the holder side flow passage in a heat transferable manner, wherein
the base includes a plurality of plate members which are layered on each other to form at least one base side flow passage for the cooling liquid to flow therein,
the plurality of element holders and the base can be connected to each other, so that the holder side flow passage and the at least one base side flow passage communicate with each other,
the plurality of element holders each include a holder side connector to be in communication with the holder side flow passage and connected to the base,
the base includes a plurality of base side connectors to be in communication with the at least one base side flow passage and connected to the plurality of element holders, and
the holder side connector and the plurality of base side connectors are connected to each other, so that the holder side flow passage communicates with the at least one base side flow passage and the plurality of optical elements held by the plurality of element holders are positioned at predetermined positions relative to the base.

12. The optical apparatus according to claim 11, wherein the exterior casing is a heat conductive member, and
at least one of the plurality of plate members of the base is a heat conductive member to be connected to the exterior casing in a heat transferable manner when the optical apparatus is assembled.

13. The optical apparatus according to claim 11, wherein at least one of the plurality of plate members of the base is a heat conductive member and is a portion of the exterior casing.

14. The optical apparatus according to claim 11, wherein the optical apparatus is a projector which modulates a light beam irradiated from a light source device to project the modulated light beam in an enlarged manner,
the plurality of optical elements include the light source device, and
the light source device is a solid light-emitting device.

15. The optical apparatus according to claim 11, further comprising:
a fluid sending unit which sucks and sends the cooling liquid, wherein
the base includes a recess which is dented in a thickness direction of the base and is in communication with the at least one base side flow passage, and
the fluid sending unit is accommodated in the recess to be supported by the base in a planarly interfering manner with a component of the optical apparatus, so that the cooling liquid in the at least one base side flow passage can be sucked and sent to the at least one base side flow passage.

16. The optical apparatus according to claim 11, wherein
the holder side connector is a tubular member in which the cooling liquid can flow, and
the base side connectors each are a through hole in which a tip end of the tubular member can be loosely disposed.

17. The optical apparatus according to claim 11, wherein
the holder side connector includes: a tubular member in which the cooling liquid can flow; and a flange which is integrally formed on the tubular member to extend from an outer peripheral portion of the tubular member toward the outside,
the base side connectors each are a through hole in which a tip end of the tubular member can be loosely disposed, and
the flange can be connected to a position in the vicinity of the through hole.

18. The optical apparatus according to claim 11, further comprising:
a flange, wherein
the holder side connector is a tubular member in which the cooling liquid can flow,
the base side connectors each are a through hole in which a tip end of the tubular member can be loosely disposed, and
the flange in which the tubular member can be inserted extends from an outer peripheral portion of the tubular member toward the outside, and the flange being connectable to a position in the vicinity of the through hole.

19. The optical apparatus according to claim 18, wherein
the tubular member is screwed and connected to the flange and to an element holder main body including one of the holder side flow passage,
the tubular member and the element holder main body have one of a right-hand thread screw structure and a left-hand thread screw structure, and
the tubular member and the flange have the other one of the right-hand thread screw structure and the left-hand thread screw structure.

20. The optical apparatus according to claim 11, wherein at least one of the plurality of element holders includes an inflow port for letting the cooling liquid to flow thereinto and an outflow port for letting the cooling liquid therein to flow to the outside in one end surface, the one end surface abutting on the base, so that the holder side flow passage communicates with the at least one base side flow passage.

21. The optical apparatus according to claim 11, further comprising:
a fluid sending unit which sucks and sends the cooling liquid, wherein
the fluid sending unit can be connected to the base to be supported by the base, so that the cooling liquid in the at least one base side flow passage can be sucked and sent to the at least one base side flow passage.

22. The optical apparatus according to claim 11, further comprising:
a heat releasing portion in which the cooling liquid can flow releases heat in the cooling liquid flowing therein to the outside, wherein the heat releasing portion can be connected to the base to be supported by the base, the heat releasing unit guiding the cooling liquid in the at least one base side flow passage thereinto and guiding the cooling liquid therein to the at least one base side flow passage.

23. The optical apparatus according to claim 11, wherein at least one of the plurality of plate members of the base is a heat conductive member.

* * * * *